United States Patent
Santi et al.

(10) Patent No.: US 11,003,881 B2
(45) Date of Patent: May 11, 2021

(54) SYSTEM FOR MULTIPLE DECODE OF CAPTURED IMAGES

(71) Applicants: Stefano Santi, Eugene, OR (US); Christian Gabor, Corvallis, OR (US); Lorenzo Vorabbi, Rimini (IT)

(72) Inventors: Stefano Santi, Eugene, OR (US); Christian Gabor, Corvallis, OR (US); Lorenzo Vorabbi, Rimini (IT)

(73) Assignee: Datalogic IP Tech S.R.L., Bologna (IT)

(*) Notice: Subject to any disclaimer, the term of this patent is extended or adjusted under 35 U.S.C. 154(b) by 0 days.

(21) Appl. No.: 16/567,924

(22) Filed: Sep. 11, 2019

(65) Prior Publication Data
US 2021/0073500 A1 Mar. 11, 2021

(51) Int. Cl.
*G06K 7/14* (2006.01)

(52) U.S. Cl.
CPC ......... *G06K 7/1456* (2013.01); *G06K 7/1413* (2013.01); *G06K 7/1417* (2013.01); *G06K 7/1443* (2013.01); *G06K 7/1452* (2013.01)

(58) Field of Classification Search
USPC .................................................. 235/462.1
See application file for complete search history.

(56) References Cited

U.S. PATENT DOCUMENTS

| | | | |
|---|---|---|---|
| 6,047,893 A | 4/2000 | Saporetti | |
| 6,863,218 B2* | 3/2005 | Muramatsu | G06K 19/06037 235/462.01 |
| 9,524,411 B2 | 12/2016 | He | |

OTHER PUBLICATIONS

Closed-Loop Object Recognition Using Reinforcement Learning, Jing Peng et al., IEEE Trans. on Pattern Anal. and Machine Intelligence, vol. 20, No. 2, Feb. 1998 (16 pages).

* cited by examiner

*Primary Examiner* — Rafferty D Kelly
(74) *Attorney, Agent, or Firm* — The Juhasz Law Firm

(57) ABSTRACT

A decoding device includes a processor configured to: analyze a captured image having a 2D captured image coordinate system to identify an instance of a type of anchor marking therein; derive an orientation thereof relative to the captured image coordinate system; correlate the type of anchor marking to a relative location of a corresponding type of target marking within a 2D normalized coordinate system; employ the location and orientation of the instance of the type of anchor marking within the captured image coordinate system, and the relative location of the type of target marking within the normalized coordinate system to derive a location of an instance of the type of target marking within the captured image coordinate system; attempt interpretation of the instance of the type of target marking at the derived location to decode data thereat; and in response to a successful decode, transmit the data to another device.

20 Claims, 13 Drawing Sheets

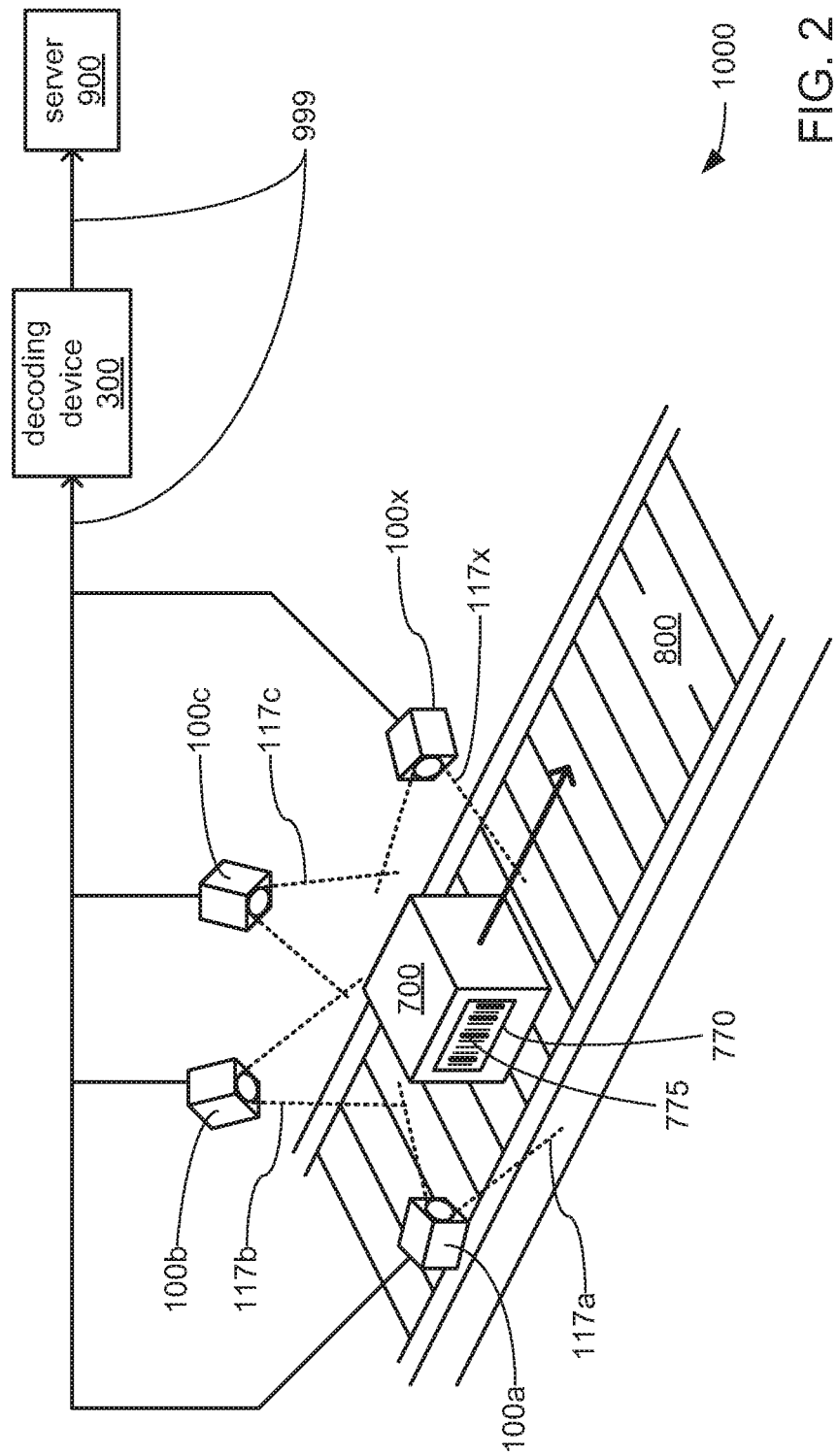

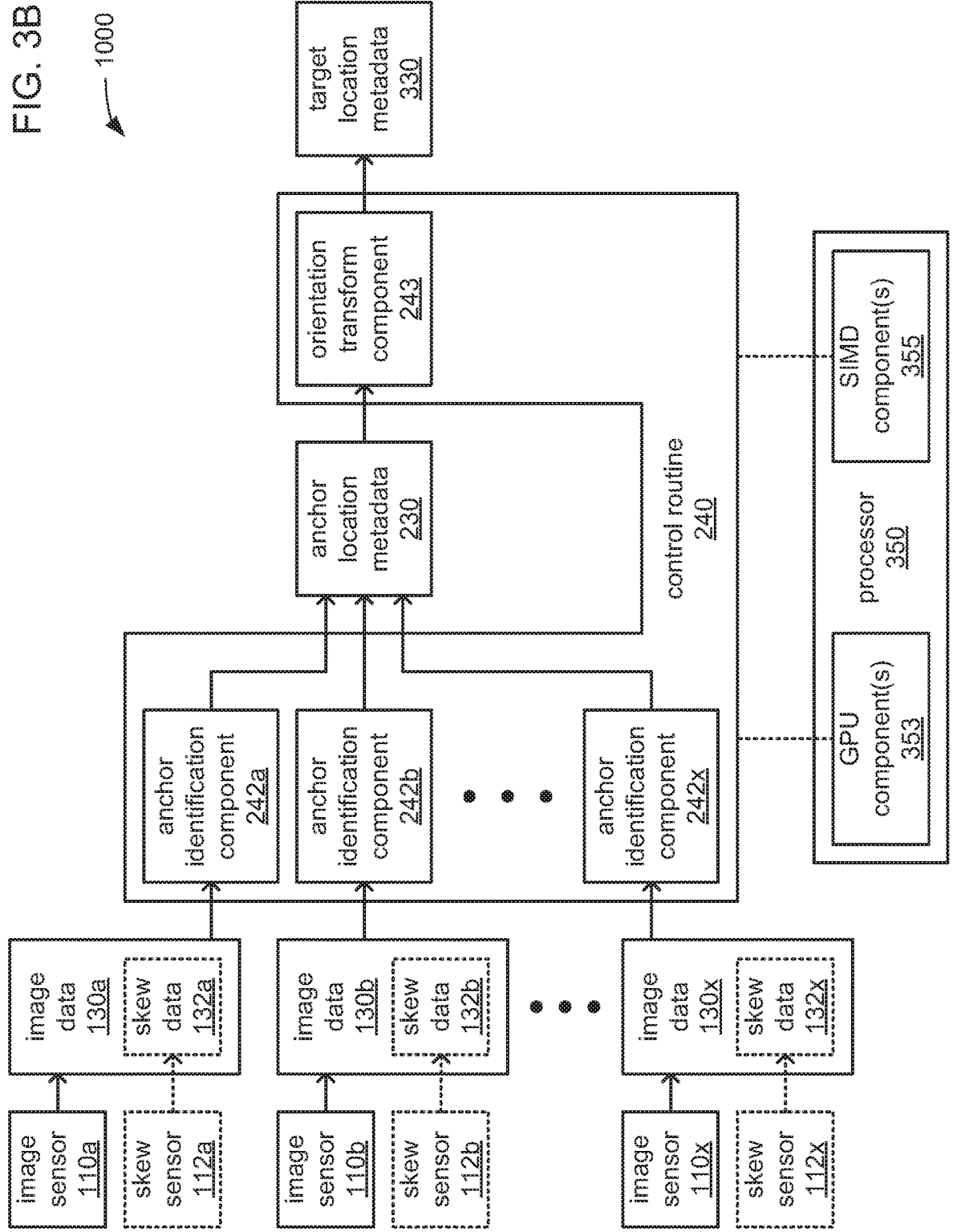

FIG. 4E

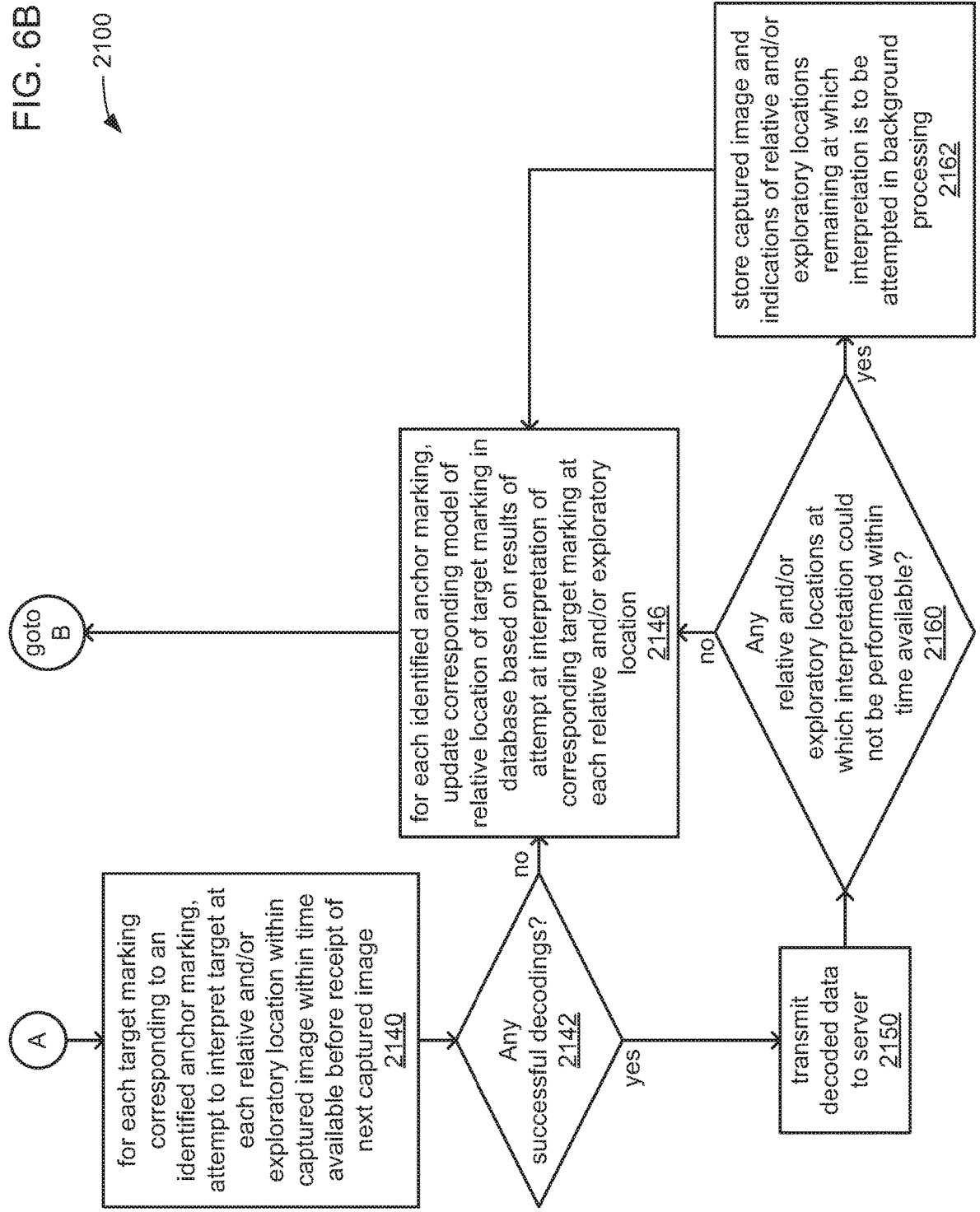

US 11,003,881 B2

SYSTEM FOR MULTIPLE DECODE OF CAPTURED IMAGES

RELATED APPLICATIONS

This application is related to: U.S. Pat. No. 6,047,893 entitled "METHOD OF LOCATING AN OBJECT-APPLIED OPTICAL CODE" and issued Apr. 11, 2000 to Claudio Saporetti; U.S. patent application Ser. No. 15/686,614 entitled "CODED IMAGE CAPTURE AND DECODING SYSTEM" and filed Aug. 25, 2017 by Stefano Santi et al.; U.S. Pat. No. 10,078,774 entitled "SIMD-BASED SYSTEM FOR MULTIPLE DECODE OF CAPTURED IMAGES" and issued Sep. 18, 2018 to Lorenzo Vorabbi et al.; and U.S. Pat. No. 10,262,436 entitled "SYSTEM FOR MULTIPLE DECODE OF CAPTURED IMAGES" and issued Apr. 16, 2019 to Lorenzo Vorabbi et al.; each of these patent documents is hereby incorporated by reference in its entirety for all purposes.

BACKGROUND

1. Field

The present invention relates to systems for use in the decode of encoded data markings applied to surfaces of objects.

2. Description of the Related Art

The application of encoded data markings that encode data, such as indicia, digital watermarks and/or human-readable text, to a surface of an object for subsequent capture and decoding to retrieve data encoded therein is well known. Also well known is the use of a camera to capture an image of such a surface in an effort to capture an image of one or more encoded data markings for decoding.

Such a camera may be a stationary camera positioned to cover a location at which an object bearing one or more of such encoded data markings may be placed and/or through which such an object may be transported. By way of example, such a camera may be positioned to place a doorway or portion of the interior of a warehouse within its field of view (FOV) to enable the capture of one or more encoded data markings carried on a surface of an object (e.g., a box, a crate, a palletized load, etc.) as the object is transported into the warehouse, is stored within the portion of the warehouse, and/or is transported out of the warehouse. By way of example, such a camera may be positioned along the path of a conveyor belt or other device along which such an object may carry such encoded data markings on a surface thereof may be moved.

As will be familiar to those skilled in the art, searching through a captured image to identify each such encoded data marking, and then interpreting each identified encoded data marking to decode the data encoded therein are typically processing-intensive tasks. Also, in situations in which multiple objects may be moved through the FOV (e.g., where the camera is positioned to cover a path through a doorway or the path of a conveyor belt), there may be a relatively small amount of time between instances of an object passing through the FOV, thereby providing only a relatively small amount of time during which each of the encoded data markings that may be carried on a surface of each object must be identified and decoded.

In particular, the processing demands of searching through a captured image to identify each location at which an encoded data marking that may be present are sufficiently great that the use of specialized circuitry implemented within an application-specific integrated circuit (ASIC) or field-programmable gate array (FPGA), in addition to a processor, to offload such work from the processor has been considered. Also, the use of multiple processors among which such work would be distributed has also been considered.

However, pairing such additional circuitry with a processor and/or employing multiple processors typically adds considerable undesired expense and complexity to decoding devices, and/or typically undesirably increases the power consumption of decoding devices. Thus, a system able to more efficiently identify each location at which an encoded data marking may be present is needed.

SUMMARY

Technologies are described for making more efficient use of processing resources in identifying and interpreting differing encoded data markings, such as differing indicia and/or digital watermarks, within an image of at least a portion of an object captured by a camera without augmentation of a processor with external specialized circuitry to offload processing operations from the processor.

A decoding device includes storage configured to store image data received from a camera of a captured image that is captured by the camera, wherein the captured image includes a two-dimensional (2D) array of pixels that define a 2D captured image coordinate system, and a processor coupled to the decoding storage. The processor is configured to: analyze the image data to identify an instance of a type of anchor marking at a location within the captured image coordinate system, and to derive an orientation of the instance of the type of anchor marking relative to the captured image coordinate system; correlate the type of anchor marking to a relative location of a corresponding type of target marking to the type of anchor marking within a 2D normalized coordinate system; employ the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; perform an attempt at interpretation of the instance of the type of target marking at the derived location within the captured image coordinate system to decode data encoded within the instance of the type of target marking; and in response to a successful decode of the data, transmit the data to a server via a network.

A decoding system includes: multiple cameras, wherein each camera includes an image sensor configured to capture an image of multiple captured images and each captured image of the multiple captured images includes a two-dimensional (2D) array of pixels that define a 2D captured image coordinate system; and a processor coupled to the multiple cameras. The processor is configured, for each captured image of the multiple captured images, to: analyze the captured image to identify an instance of a type of anchor marking at a location within the captured image coordinate system, and to derive an orientation of the instance of the type of anchor marking relative to the captured image coordinate system; correlate the type of anchor marking to a relative location of a corresponding type of target marking to the type of anchor marking within a 2D normalized coordinate system; employ the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; perform an attempt at interpretation of the instance of the type of target marking at the derived location within the captured image coordinate system to decode of data encoded within the instance of the type of target marking; and in response to a successful decode of the data, transmit the data to a server via a network.

A method for decoding data encoded within encoded data markings includes: receiving, at a decoding device, image data from a camera of a captured image captured by the camera, wherein the captured image includes a two-dimensional (2D) array of pixels that define a 2D captured image coordinate system; analyzing, by a processor of the decoding device, the image data to identify an instance of an anchor marking at a location within the captured image coordinate system, and to derive an orientation of the instance of the type of anchor marking to the captured image coordinate system; correlating the type of anchor marking to a relative location of a corresponding type of target marking to the type of anchor marking within a 2D normalized coordinate system; employing, by the processor, the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; performing, by the processor, an attempt at interpretation of the instance of the target marking at the derived location within the captured image coordinate system to decode data encoded within the instance of the type of target marking; and in response to a successful decode of the data, transmitting the data to a server via a network.

BRIEF DESCRIPTION OF THE DRAWINGS

FIG. 2 shows aspects of an example use of the decoding system of FIG. 1.

FIGS. 3A, 3B and 3C, together, show aspects of an example internal architecture of a decoding device of the decoding system of FIG. 1.

FIGS. 4A, 4B, 4C, 4D and 4E, together, show aspects of identifying locations of anchor markings, and then target markings within a captured image for decoding.

FIGS. 6A and 6B, together, show aspects of the operation of an implementation of the system of FIG. 1.

DETAILED DESCRIPTION

Figure 1:
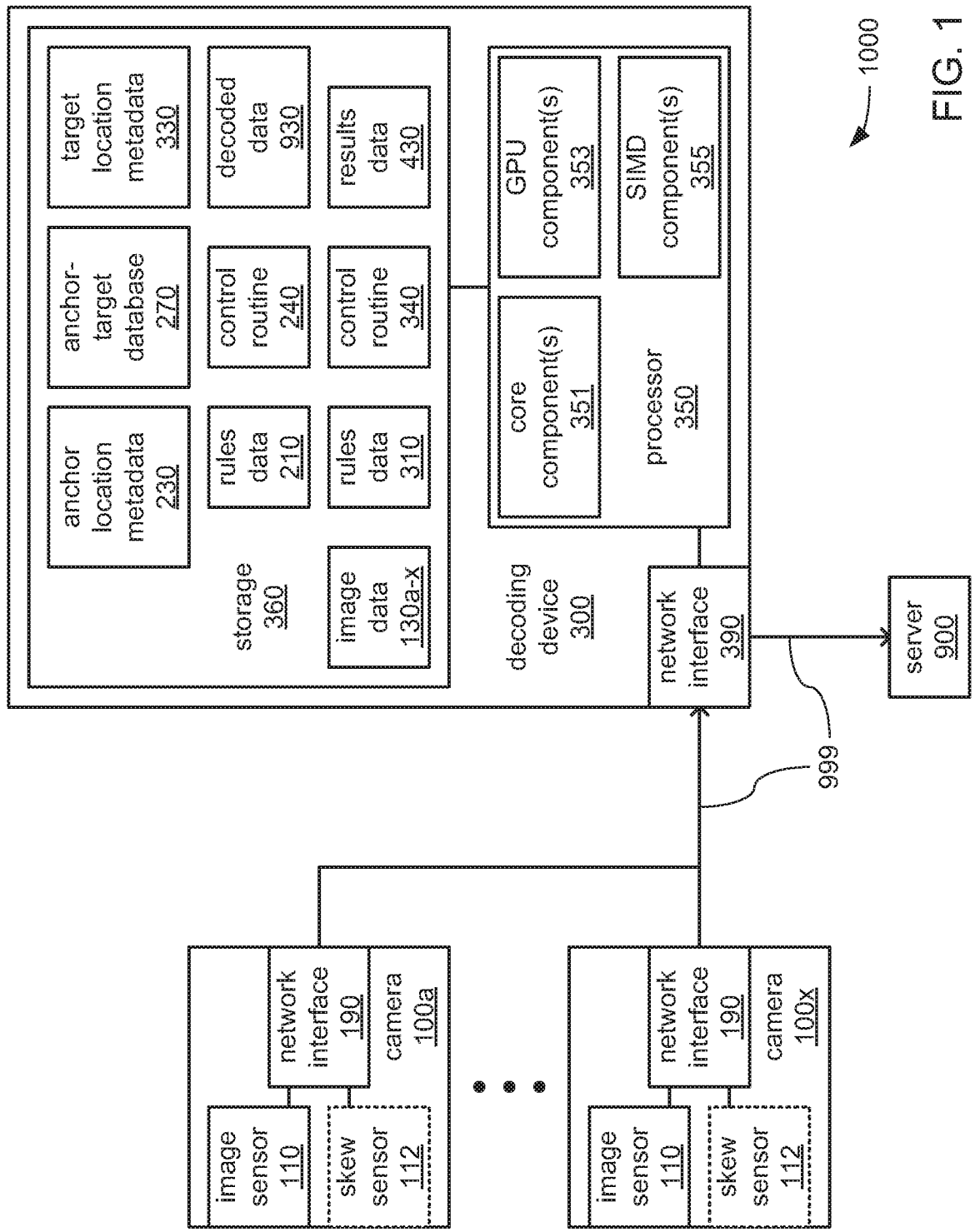
FIG. 1 shows aspects of an example implementation of a decoding system.

This detailed disclosure further incorporates by reference the disclosure provided in U.S. Pat. No. 6,047,893 entitled "METHOD OF LOCATING AN OBJECT-APPLIED OPTICAL CODE" and issued Apr. 11, 2000 to Claudio Saporetti; the disclosure provided in U.S. patent application Ser. No. 15/686,614 entitled "CODED IMAGE CAPTURE AND DECODING SYSTEM" and filed Aug. 25, 2017 by Stefano Santi et al.; the disclosure provided in U.S. Pat. No. 10,078,774 entitled "SIMD-BASED SYSTEM FOR MULTIPLE DECODE OF CAPTURED IMAGES" and issued Sep. 18, 2018 to Lorenzo Vorabbi et al.; and the disclosure provided in U.S. Pat. No. 10,262,436 entitled "SYSTEM FOR MULTIPLE DECODE OF CAPTURED IMAGES" and issued Apr. 16, 2019 to Lorenzo Vorabbi et al.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decoding system to identify and decode one or more encoded data markings that encode data, such as one-dimensional (1D) or two-dimensional (2D) indicia, digital watermarks and/or human-readable text, that are included within an image of at least a portion of an object captured by a camera.

A decoding device includes storage configured to store image data received from a camera of a captured image that is captured by the camera, wherein the captured image includes a two-dimensional (2D) array of pixels that define a 2D captured image coordinate system, and a processor coupled to the decoding storage. The processor is configured to: analyze the image data to identify an instance of a type of anchor marking at a location within the captured image coordinate system, and to derive an orientation of the instance of the type of anchor marking relative to the captured image coordinate system; correlate the type of anchor marking to a relative location of a corresponding type of target marking to the type of anchor marking within a 2D normalized coordinate system; employ the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; perform an attempt at interpretation of the instance of the type of target marking at the derived location within the captured image coordinate system to decode data encoded within the instance of the type of target marking; and in response to a successful decode of the data, transmit the data to a server via a network.

A decoding system includes: multiple cameras, wherein each camera includes an image sensor configured to capture an image of multiple captured images and each captured image of the multiple captured images includes a two-dimensional (2D) array of pixels that define a 2D captured image coordinate system; and a processor coupled to the multiple cameras. The processor is configured, for each captured image of the multiple captured images, to: analyze the captured image to identify an instance of a type of anchor marking at a location within the captured image coordinate system, and to derive an orientation of the instance of the type of anchor marking relative to the captured image coordinate system; correlate the type of anchor marking to a relative location of a corresponding type of target marking to the type of anchor marking within a 2D normalized coordinate system; employ the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; perform an attempt at interpretation of the instance of the type of target marking at the derived location within the captured image coordinate system to decode of data encoded within the instance of the type of target marking; and in response to a successful decode of the data, transmit the data to a server via a network.

A method for decoding data encoded within encoded data markings includes: receiving, at a decoding device, image data from a camera of a captured image captured by the camera, wherein the captured image includes a two-dimensional (2D) array of pixels that define a 2D captured image coordinate system; analyzing, by a processor of the decoding device, the image data to identify an instance of an anchor marking at a location within the captured image coordinate system, and to derive an orientation of the instance of the type of anchor marking to the captured image coordinate system; correlating the type of anchor marking to a relative location of a corresponding type of target marking to the type of anchor marking within a 2D normalized coordinate system; employing, by the processor, the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; performing, by the processor, an attempt at interpretation of the instance of the target marking at the derived location within the captured image coordinate system to decode data encoded within the instance of the type of target marking; and in response to a successful decode of the data, transmitting the data to a server via a network.

FIG. 1 depicts aspects of an example embodiment of a decoding system 1000 that may include one or more cameras 100*a* through 100*x* and/or a decoding device 300 coupled by a network 999 (e.g., the cable-based and/or wireless links interconnecting devices). The one or more cameras 100*a-x* and the decoding device 300 may cooperate through the network 999 to capture and decode images of encoded data markings carried on surface(s) of objects, such as indicia, digital watermarks and/or human-readable text. Following such decoding, the decoding device 300 may further transmit the decoded data to another device, such as the depicted example server 900, through the network 999.

Each of the one or more cameras 100*a-x* may include an image sensor 110, a skew sensor 112 and/or a network interface 190 to provide coupling to the network 999. Within each camera 100, the image sensor 110 and the network interface 190 may be communicatively coupled to exchange data therebetween through the exchange of electrical, optical, magnetic and/or other signals through one or more buses and/or other form of interconnect. The image sensor 110 may capture an image within its field of view and provide the captured image to the network interface 190 to transmit to the decoding device 300 via the network 999.

Within each of the one or more cameras 100*a-x*, the skew sensor 112 (if present) and the network interface 190 may also be communicatively coupled to exchange data therebetween through the exchange of electrical, optical, magnetic and/or other signals through one or more buses and/or other form of interconnect. The skew sensor 112 may detect a degree of skew between the plane of a surface of an object carrying encoded data marking(s) and the plane of the images captured by the image sensor 110. The skew sensor 112 may provide an indication of the detected degree of skew to the network interface 190 to transmit to the decoding device 300 via the network 999.

The decoding device 300 may include a processor 350, a storage 360 and a network interface 390 to couple the decoding device 300 to the network 999. The processor 350 may incorporate one or more core components 351, one or more graphics processing unit (GPU) components 353, and/or one or more single-instruction multiple-data (SIMD) components 355. The storage 360 may store one or more of image data 130*a-x*; rules data 210, anchor location metadata 230, a control routine 240, target location metadata 330, a control routine 340, results data 430, and decoded data 930. Within the decoding device 300, the storage 360 and the network interface 390 may each be communicatively coupled to the processor 350 to exchange data therewith through the exchange of electrical, optical, magnetic and/or other signals through one or more buses and/or other form of interconnect.

Each of the one or more core components 351, the one or more GPU components 353 and the one or more SIMD components 355 may employ different processing architectures supporting different instruction sets to perform different operations. By way of example, each of the one or more core components 351 may support a larger and more complex instruction set than the one or more GPU components 353 and the one or more SIMD component 355, and therefore, may support a wider range of operations with a relatively limited number of operands, which may include a wider range of branching instructions. In contrast, the one or more GPU components 353 and/or the one or more SIMD components 355 may support a smaller and less complex instruction set than the one or more core components 351, but may support the performance of that narrower range of operations across numerous operands at least partially in parallel. For the one or more GPU components 353, this may be realized through the at least partially parallel performance of the same operations on many separate pieces of data across numerous GPU cores. For the one or more SIMD components 355, this may realized with sets of multiple operands supported in side-by-side lanes of a set of SIMD registers. However, the one or more GPU components 353, and the one or more the SIMD components 355 may not support branching instructions. As a result, in executing instructions, the operation and use of the one or more GPU components 353 and/or of the one or more SIMD component 355 may be controlled by the one or more core components 351.

Each of the control routines 240 and 340 may incorporate a sequence of instructions operative on the processor 350 to implement logic to perform various functions. As will be explained in greater detail, different ones of the one or more core components 351, the one or more GPU components 353 and the one or more SIMD components 355 of the processor 350 may be employed in executing different portions and/or different ones of the control routines 240 and 340 to perform different ones of the various functions.

In executing the control routine 240, the processor 350 may be caused to operate the network interface 390 to receive a stream of data bits from each of the one or more cameras 100a-x. Each of such stream from each of the one or more cameras 100a-x may convey an image captured by its corresponding image sensor 110, and the processor 350 may store the received data bits of the captured image from each of the one or more cameras 100a-x in the storage 360 as a corresponding one of image data 130a-x. With the captured images from the one or more cameras 100a-x so stored, the processor 350 may be further caused by the control routine 240 to analyze each of the image data 100a-x to identify locations at which anchor markings may be present within each of the captured images.

As will be familiar to those skilled in the art, it is commonplace for many varieties of encoded data markings that are applied to surfaces of objects (e.g., either directly onto such surfaces or as printed onto labels that are applied onto such surfaces) to be accompanied by other markings. By way of example, such encoded data markings as either a 1D or 2D barcode may be accompanied by human-readable text that may repeat at least a portion of the data that is encoded the barcode. By way of another example, to adhere to multiple standards for encoded data markings, multiple encoded data markings of different types that encode the same data may be applied side-by-side to the same surface of the object (e.g., a 1D barcode together with a 2D barcode, or a 2D barcode together with a digital watermark). In such situations, it is commonplace for such sets of markings that accompany each other to be positioned at predictable locations relative to each other on the surface of an object (again, whether applied directly thereto or carried on a label that is applied thereto).

As a result, it has been determined that it is often possible to rely on the location and orientation of one marking on a surface of an object to provide an indication of the location at which another marking may be found elsewhere on the object. Stated differently, it may be possible to identify the location of a harder to find "target marking" by, instead, searching for and identifying the location of a different easier to find "anchor" marking" that can serve as a guide to the location of that harder to find target marking. As will be familiar to those skilled in the art, any of a variety of circumstances may contribute to one marking being harder to identify the location of than another. By way of example, many 2D barcodes are made up of a grid of light and dark (e.g., white and black) graphical elements that has appearance characteristics that cause it to blend all too well into their surroundings, and/or that don't lend themselves to efficient discovery through the use of typical machine vision techniques. Thus, in situations where such a harder to find marking is accompanied by another easier to find marking at a predictable relative location, it may be more efficient to locate the easier to find marking and use its location and orientation as the anchor that serves as a guide leading to the location of the harder to find marking as the target.

Each encoded data marking that is selected to be a target marking to which another marking is selected to serve as an anchor marking may be any of a wide variety of types of encoded data marking that may encode any of a wide variety of types of data, including and not limited to 1D or 2D barcodes, digital watermarks and/or human-readable text. In some embodiments, at least a subset of the markings that are selected to be used as anchor markings serving as guides to target markings may not, themselves, encode any data. Such anchor markings may be decorative markings and/or may serve still another purpose than the encoding data. However, in other embodiments, at least a subset of the markings selected to be used as anchor markings may also, themselves, be encoded data markings such that they do encode data. Thus, in such embodiments, one or more of the anchor markings identified as present on a surface of an object may, themselves, be decoded along with the target markings that they serve as a guide to finding.

As each anchor marking is identified in one of the captured images stored as the image data 130a-x, indications of the type of anchor marking, and/or its identified location and/or orientation within that one of the captured images may be temporarily stored within the anchor location metadata 230. Subsequently, the processor 350 may use each such indication of an anchor marking stored within the anchor location metadata 230 to derive the relative location of a corresponding target marking within the same captured image. As each location of a target marking is so derived within one of the captured images, indications of the type of target marking, and/or its identified location and/or orientation within that one of the captured images may be temporarily stored within the target location metadata 330.

In executing the control routine 340, the processor 350 may be caused to use each such indication of a target marking stored within the target location metadata 330 to attempt a performance of interpretation of the target marking that may be present at the indicated location to decode the data encoded therein. For each successful decoding of a target marking, the data that is decoded therefrom may be temporarily stored within the decoded data 930, and the processor 350 may be caused to operate the network interface 390 to transmit the decoded data 930 to the server 900 where any of a variety of uses may be made of the decoded data 930.

In some embodiments, the processor 350 may be further caused to employ machine learning to refine the derivation of the locations of target markings based on the locations and orientations of corresponding anchor markings. In such embodiments, indications of each instance of success in attempting to interpret a target marking at a location indicated in the target location metadata 330 and/or each instance of a lack thereof may be stored within the results data 430 for subsequent use in such machine learning.

In some embodiments making such use of machine learning, the exploitation of past successes in interpretation to derive locations of target markings may be coupled with a predetermined degree of exploration in which the locations derived on the basis of past successful and/or unsuccessful interpretations are augmented with one or more locations that are randomly selected for experimental efforts at attempting to interpret a target marking. Stated differently, the indications stored within the target location metadata 330 of locations for target markings derived based on the results of past attempts at interpreting target markings may be accompanied by indications stored within the target location metadata 330 of other randomly selected locations at which interpretation of target markings are also to be attempted as a way of testing whether there may be target markings at those other locations.

Still referring to FIG. 1, the image sensor 110 within each of the one or more cameras 100a-x may be based on any of a variety of technologies and may employ any of a variety of optical scanning and/or other image capturing techniques to capture an image of encoded data markings (e.g., indicia, digital watermarks and/or text) carried by a portion of an object. More specifically, the image sensor 110 may include any of a variety of light sensing components to effect the capture of an image that may include encoded data markings, including and not limited to, a charge-coupled device (CCD) or complementary metal-oxide-semiconductor (CMOS) sensor providing a single row of individual light sensors operated in a manner that sweeps over encoded data markings to perform a scan thereof, or a CCD or CMOS sensor providing a two-dimensional (2D) array of individual light sensors to capture a 2D image of one or more encoded data markings. In some embodiments, the image sensor 110 and/or another component of each of the one or more cameras 100a-x may emit various forms of collimated and/or monochromatic light, including light that projects any of a variety of patterns onto a surface of an object that carries one or more encoded data markings. As those skilled in the art will readily recognize, such an emission of light may be to provide sufficient illumination to ensure that an encoded data marking is sufficiently visible to be captured, and/or may provide a visible pattern of markers on a surface of an object and/or encoded data marking as a guide to determining the orientation of the encoded data marking relative to the image sensor 110 to improve the accuracy with which the data encoded therein may be decoded.

The skew sensor 112 that may be present within at least a subset of the one or more cameras 100a-x may be based on any of a variety of technologies and/or may employ any of a variety of optical, sonic, magnetic, mechanical and/or other techniques to detect a degree of skew between the plane of a surface of the object that may carry one or more encoded data markings and the plane of the image captured by the image sensor 110. Alternatively or additionally, the emission of collimated light and/or other technologies incorporated into the image sensor 110 and/or each of the one or more cameras 100a-x may be employed to detect such a degree of skew.

The object onto which one or more encoded data markings may be applied may be any of a variety of objects, including and not limited to, a package carrying a shipping label that includes encoded data marking(s), or a product for sale within retail packaging on which encoded data marking(s) are printed as part of the graphical artwork thereof. The data encoded within such encoded data markings may include, and not be limited to, data indicating the addresses of a sender and/or intended recipient of a package, or data providing a universal product code (UPC) that uniquely identifies a product for sale.

Each encoded data marking that is implemented as an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; Post-Bar; POSTNET; RM4SCC/KIX; Telepen; UPC; Aztec Code; Code 1; ColorCode; Color Construct Code; Cronto-Sign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

The storage 360 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

The processor 350 may include any of a wide variety of processors, microcontrollers, gate-array logic devices, etc. that may be incorporate any of a variety of features to enhance speed and/or efficiency of processing operations. Such features may include and are not limited to, multi-threading support per core component 351, multiple processing core components 351, directly integrated memory control functionality, and/or various modes of operation by which speed of throughput and/or level of power consumption may be dynamically altered.

Although the one or more SIMD components 355 are depicted as separate from the one or more core components 351, other embodiments of the processor 350 are possible in which the SIMD component 355 may be a component of a core component 351. Alternatively or additionally, where there are multiple core component 351, more than one of the multiple core components 351 may each include at least one SIMD component 355.

In embodiments in which the processor 350 incorporates one or more of the GPU components 353, one or more of the SIMD component 355 may be incorporated into each such GPU component 353. In still other embodiments, the processor 350 may be a GPU that in some way incorporates one or more of the SIMD components 355, and/or the decoding device 300 may incorporate a GPU that is separate and distinct from the processor 350, and that may incorporate one or more of the SIMD components 355 in addition to or in lieu of the processor 350 doing so.

Each processor 350 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the network interfaces 190 and/or 390 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interfaces 190 and/or 390 may each be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

FIG. 2 depicts aspects of an example of use of an example implementation of the decoding system 1000 of FIG. 1 in capturing, identifying and decoding encoded data markings 775 that may be applied to a label or portion 770 of a surface of an object 700 in the form of a package moved along the path of a conveyor belt 800. More specifically, FIG. 2 provides a combination of perspective view and block diagram of an example implementation of the decoding system 1000 that includes at least four cameras 100a, 100b, 100c and 100x positioned in a manner that surrounds a location along the path of the conveyor belt 800, which becomes the path along which the object 700 is moved. It should be noted that this depiction of this example use of this example implementation of the decoding system 1000 is but one possible example provided herein for purposes of illustration, and should not be taken as limiting. Stated differently, other uses of other implementations of the decoding system 1000 are possible in which the object 700 may be any of a variety of objects other than a package moved along a conveyor belt, in which a different quantity of the cameras 100a-x may be used, and/or in which each of the cameras 100a-x may be mounted as a set to a vehicle such that it is the cameras 100a-x of the decoding system 1000 that are moved relative to the object 700, instead of the object 700 being moved relative to the cameras 100a-x.

As depicted in FIG. 2, the at least four cameras 100a-x are positioned to cause at least a portion of a location along the conveyor 800 to be placed within each of the FOVs 117a-x of the image sensor 110 within each of the cameras 100a-x, respectively. As depicted, two or more of the FOVs 117a-x may overlap. However, it should be noted that embodiments are possible in which none of the FOVs 117a-x overlap. Indeed, other embodiments are possible in which two or more of the cameras 100a-x may be positioned to place entirely different locations along the path of the conveyor belt 800 within their respective ones of the FOVs 117a-x. Stated differently, the at least four cameras 100a-x may be positioned to cover a single location along the conveyor 800 such that each is able to capture an image of a different portion of the object 700 simultaneously as the object 700 moves along the path of the conveyor belt 800, or the at least four cameras 100a-x may be positioned to cover different locations along the path of the conveyor belt 800 such that each is able to capture an image of a different portion of the object 700 as the object 700 moves through their separate ones of the FOVs 117a-x at different times.

Regardless of the manner in which the at least four cameras 100a-x are positioned relative to one or more locations along the path of the conveyor belt 800, and as has been discussed in reference to FIG. 1, each of the at least four cameras 100a-x may be communicatively coupled to the decoding device 300 through the network 999, and may cooperate with the decoding device 300 through the network 999 to identify and decode one or more encoded data markings 775 captured in at least one image by one or more of the at least four cameras 100a-x. Also as discussed in reference to FIG. 1, following such decoding, the resulting decoded data 930 may be transmitted by the decoding device 300 to another device via the network 999, such as the depicted server 900.

Figure 3A:
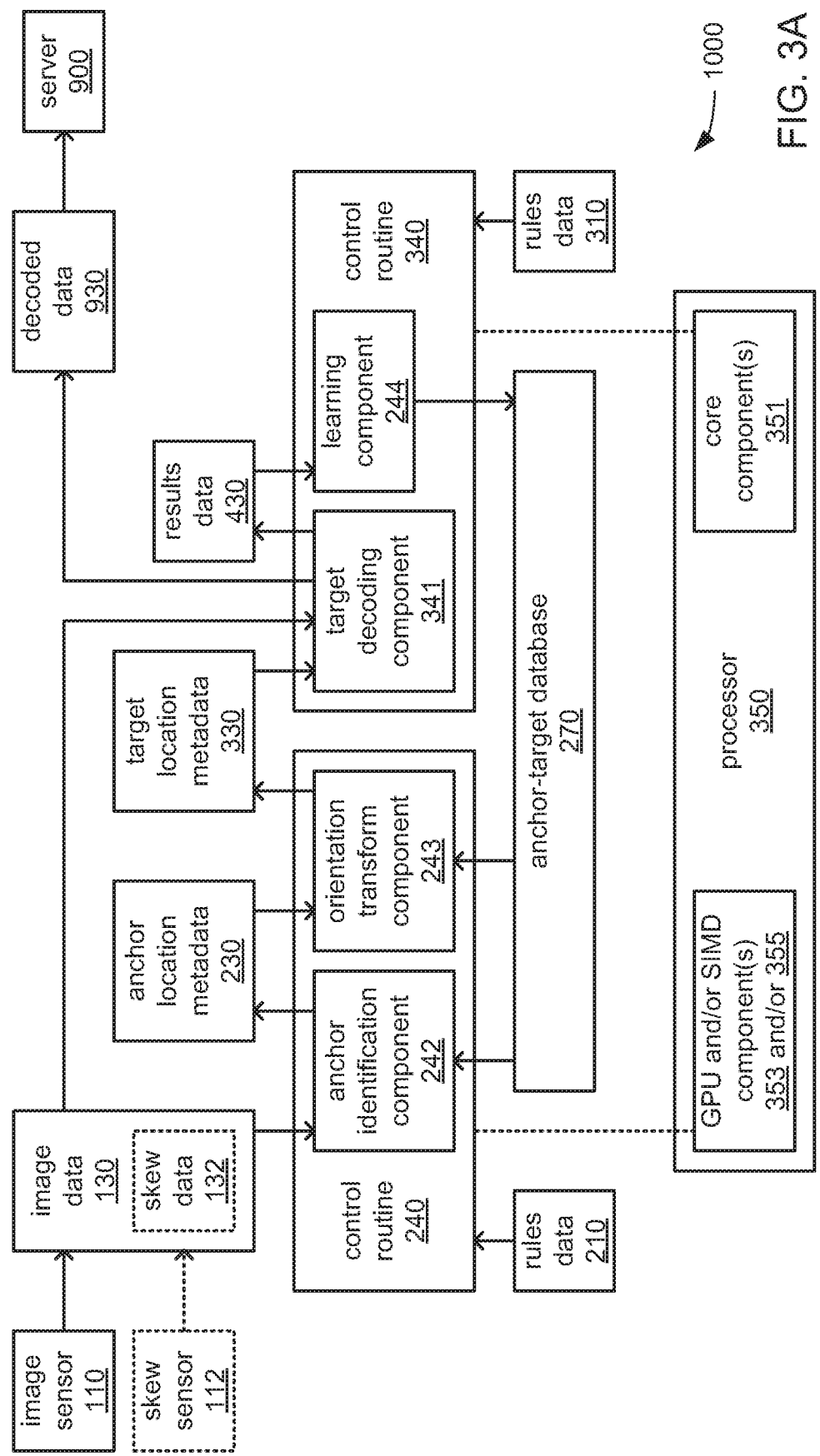
Figure 3C:
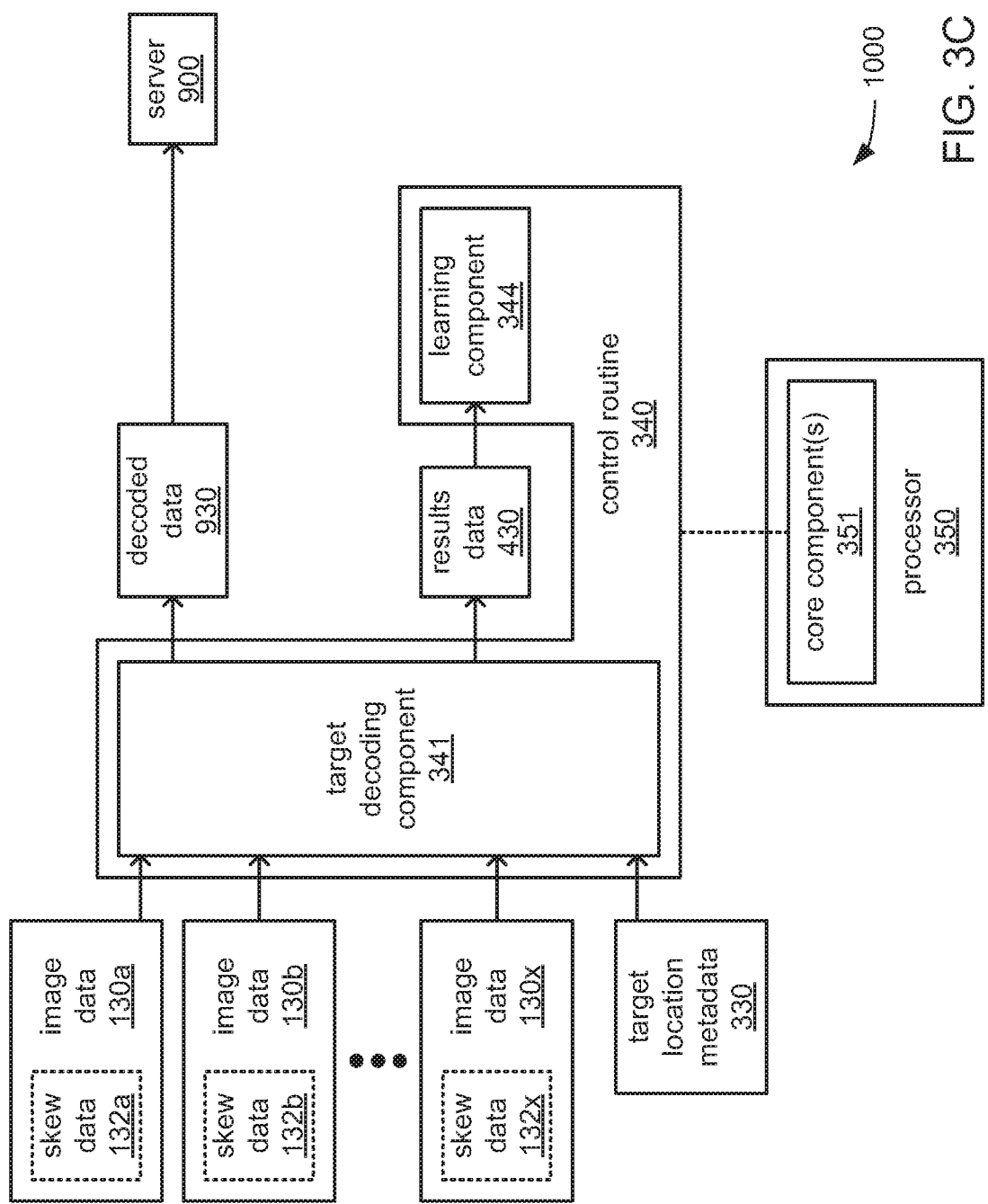

FIGS. 3A, 3B and 3C, together, depict aspects of an example embodiment of an internal architecture of the decoding device 300 of the decoding system 1000. Further, FIGS. 3B and 3C depict aspects of an embodiment of accommodating the receipt of captured images via the network 999 from multiple cameras 100a-x in greater detail.

Turning to FIG. 3A, depending on which of the components 351, 353 and/or 355 are incorporated into the processor 350, different ones of the one or more core components 351, the one or more GPU components 353 and/or the one or more SIMD components 355 of the processor 350 may be employed in executing different portions and/or different ones of the control routines 240 and 340 to perform different ones of the various functions described above. Thus, as depicted, it may be that the one or more GPU components 353 and/or the one or more SIMD components 355 perform the functions described above in connection with the control routine 240, while the one or more core components 351 perform the functions described above in connection with the control routine 340.

Such a division of functions performed among differing ones of the components 351, 353 and/or 355 of the processor 350 may be based on differences between the markings selected to be anchor markings and the markings selected to be target markings, in addition to or in lieu of being based on differences among the functions to be performed. As those skilled in the art will readily recognize, since the markings that are selected to be anchor markings are so selected based on being easier to find, the algorithms that are likely to be employed to locate and identify the anchor markings may be more amenable to being executed using the simpler instruction sets of the one or more GPU components 353 and/or of the one or more SIMD components 355. In contrast, and as those skilled in the art will readily recognize, the algorithms that are likely to be employed to interpret the target markings to decode the data stored therein may, as a result of their likely greater complexity, be more amenable to being executed using the more complex instruction set of the one or more core components 351.

Thus, as depicted in FIG. 3A, while it may be the one or more core components 351 that may retrieve the control routine 240 from the storage 360 (see FIG. 1), it may be the one or more GPU components 353 and/or the one or more SIMD components 355 that are caused by execution of the instructions of an anchor identification component 242 thereof to identify the locations of anchor markings within captured images, and to store indications of the type, location and/or orientation of each such identified anchor marking as part of the anchor location metadata 230. Further, it may also be the one or more GPU components 353 and/or the one or more SIMD components 355 that are caused by execution of the instructions of an orientation transform component 243 of the control routine 240 to employ such indications in the anchor location metadata 230 to derive corresponding indications of the locations of corresponding target markings, and to store indications of the type and/or location of each such identified location for a target marking as part of the target location metadata 330.

In contrast, it may be the one or more core components 351 of the processor 350 that, in addition to retrieving the control routine 340 from the storage 360, are caused by execution of the instructions of a target decoding component 341 of the control routine 340 to attempt to interpret a target marking at each location indicated in the target location metadata 330 to decode data that may be encoded therein. In so doing, the one or more core components 351 may also be caused to store indications of which locations were the ones at which a successful decoding of encoded data occurred, and/or which locations were the ones at which there was no such success as part of the results data 430, as well as storing any data that is so decoded as part of the decoded data 930 to be transmitted to the server 900. Further, it may also be the one or more core components 351 that are caused by execution of the instructions of a learning component to employ the indications of successful and/or unsuccessful attempts at decoding encoded data in the results data 430 to refine indications in the anchor-target database 270 of locations of target markings relative to corresponding anchor markings, which are relied upon in deriving the locations of target markings within the target location metadata 330.

Turning to FIGS. 3B-C, the embodiment of division of functions of FIG. 3A may also be advantageous in accommodating the receipt of captured images from multiple cameras 100a-x. As will be familiar to those skilled in the art, the typically greater quantities of cores within a typical GPU component and/or the typically greater bit widths of the registers within a typical SIMD component may each be more readily capable of enabling at least partially parallel performances of operations on the pixel data of multiple captured images than the typically smaller quantities of core components in typical processors and the typically narrower registers thereof.

Therefore, as depicted in FIG. 3B, the greater affinity for at least partially parallel execution of either the one or more GPU components 353 and/or the one or more SIMD components 355 may be employed in analyzing each of the captured images received from each of cameras 100a-x and stored as corresponding image data 130a-x at least partially in parallel to search for and identify locations of anchor markings thereamong. In contrast, and as depicted in FIG. 3C, the more extensive and complex instruction set of the one or more core components 351 may be employed in interpreting each target marking to attempt to decode the data that may be encoded therein.

Figure 4A:
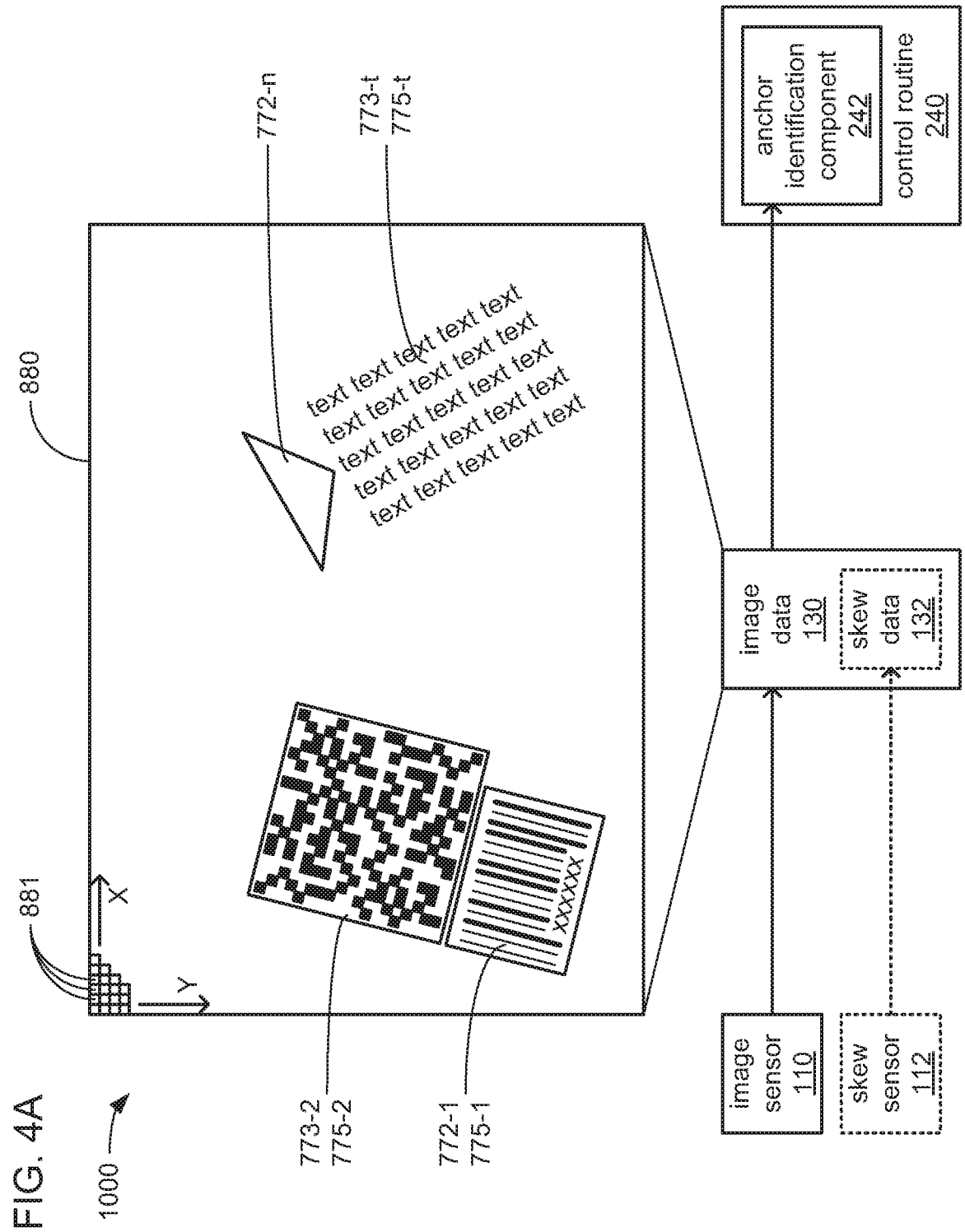
Figure 4B:
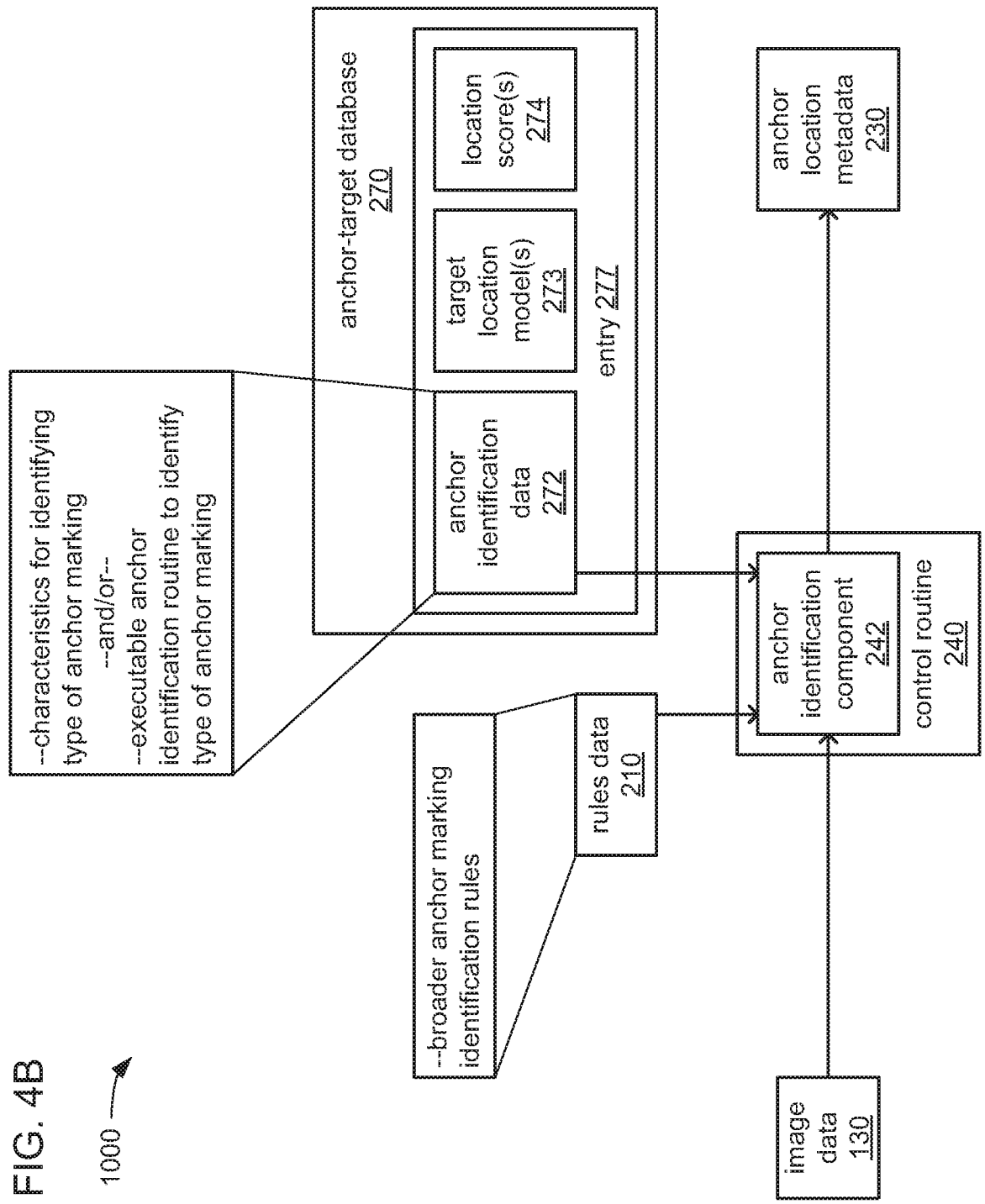
Figure 4C:
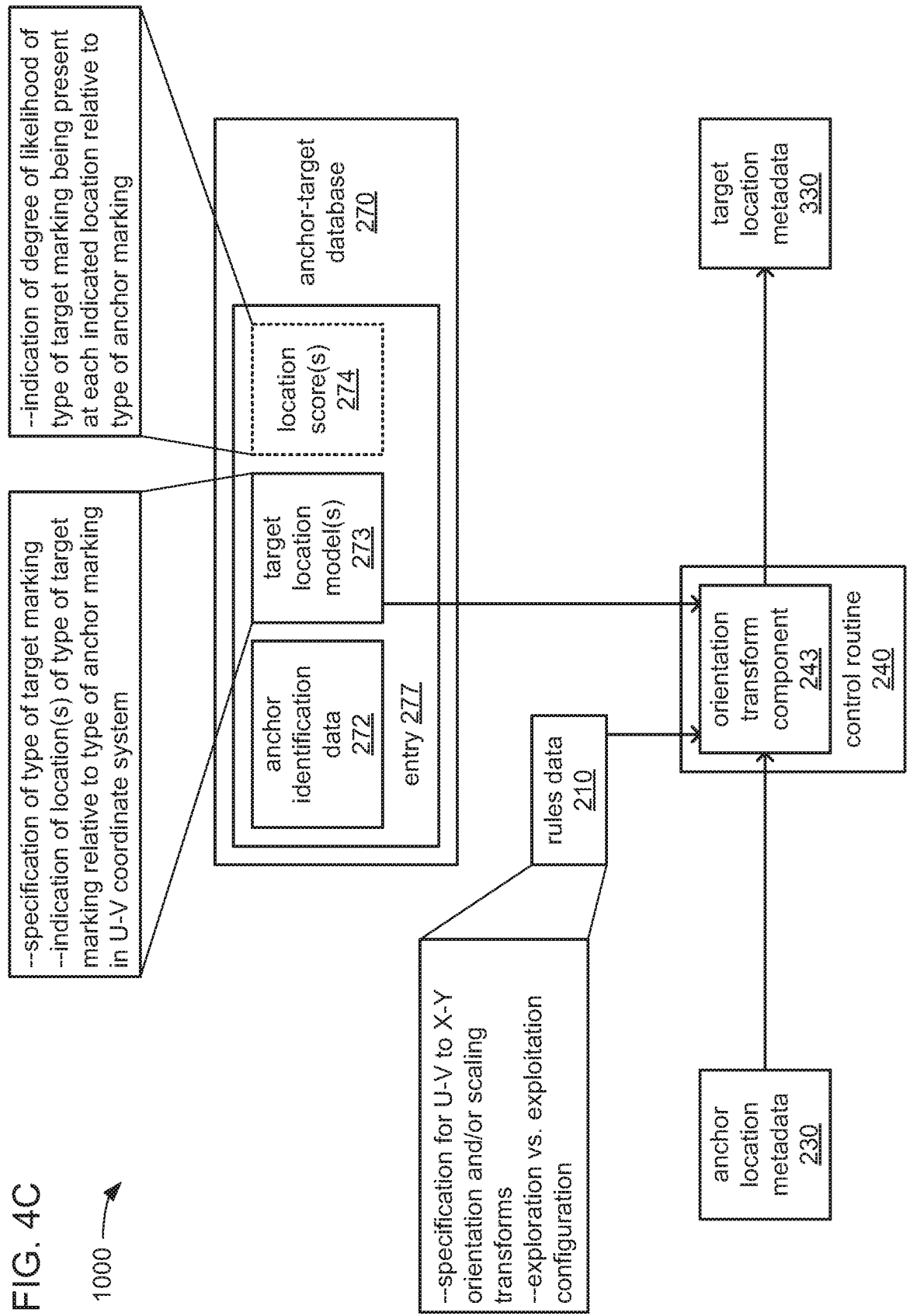
Figure 4D:
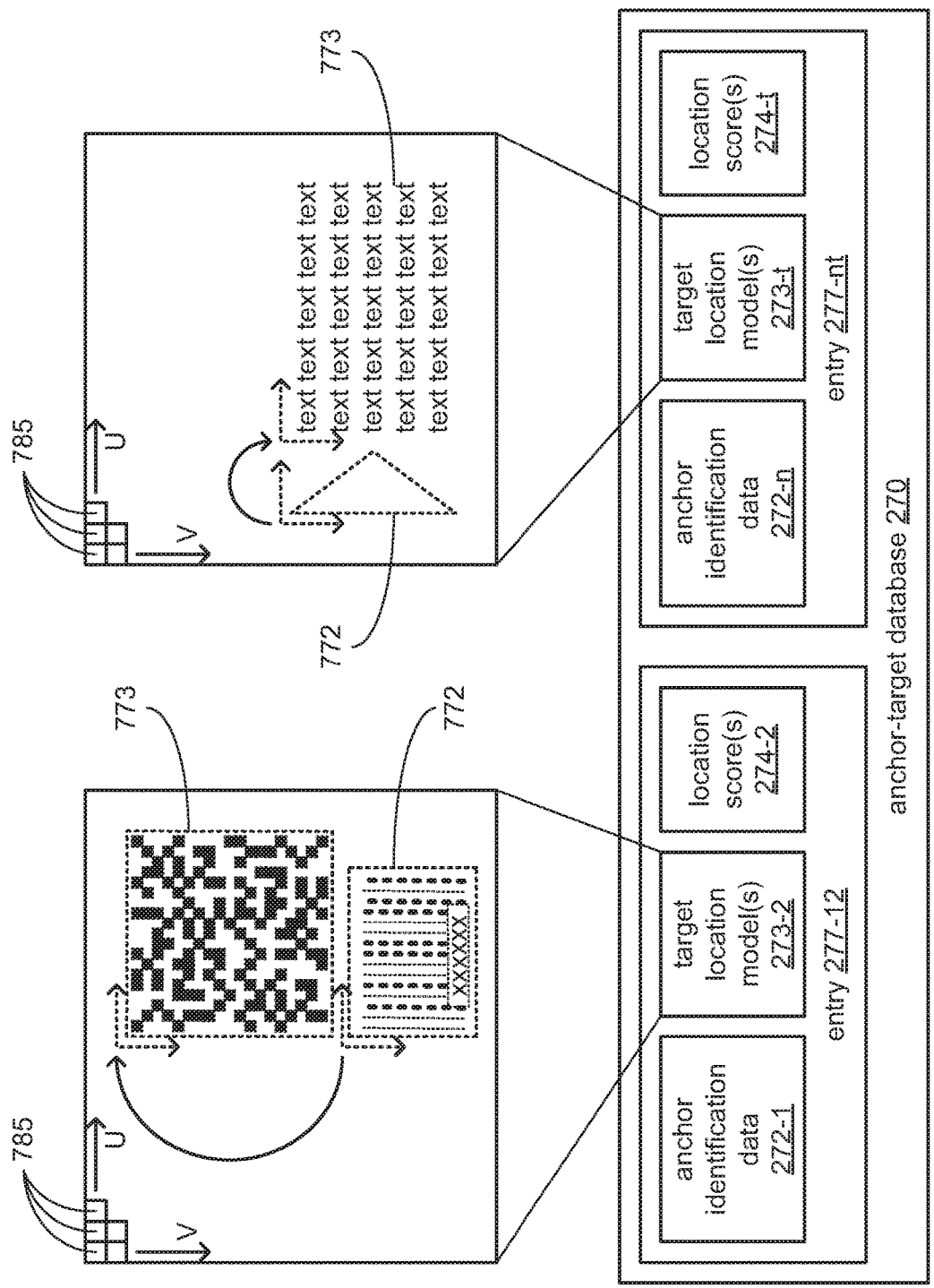
Figure 4E:
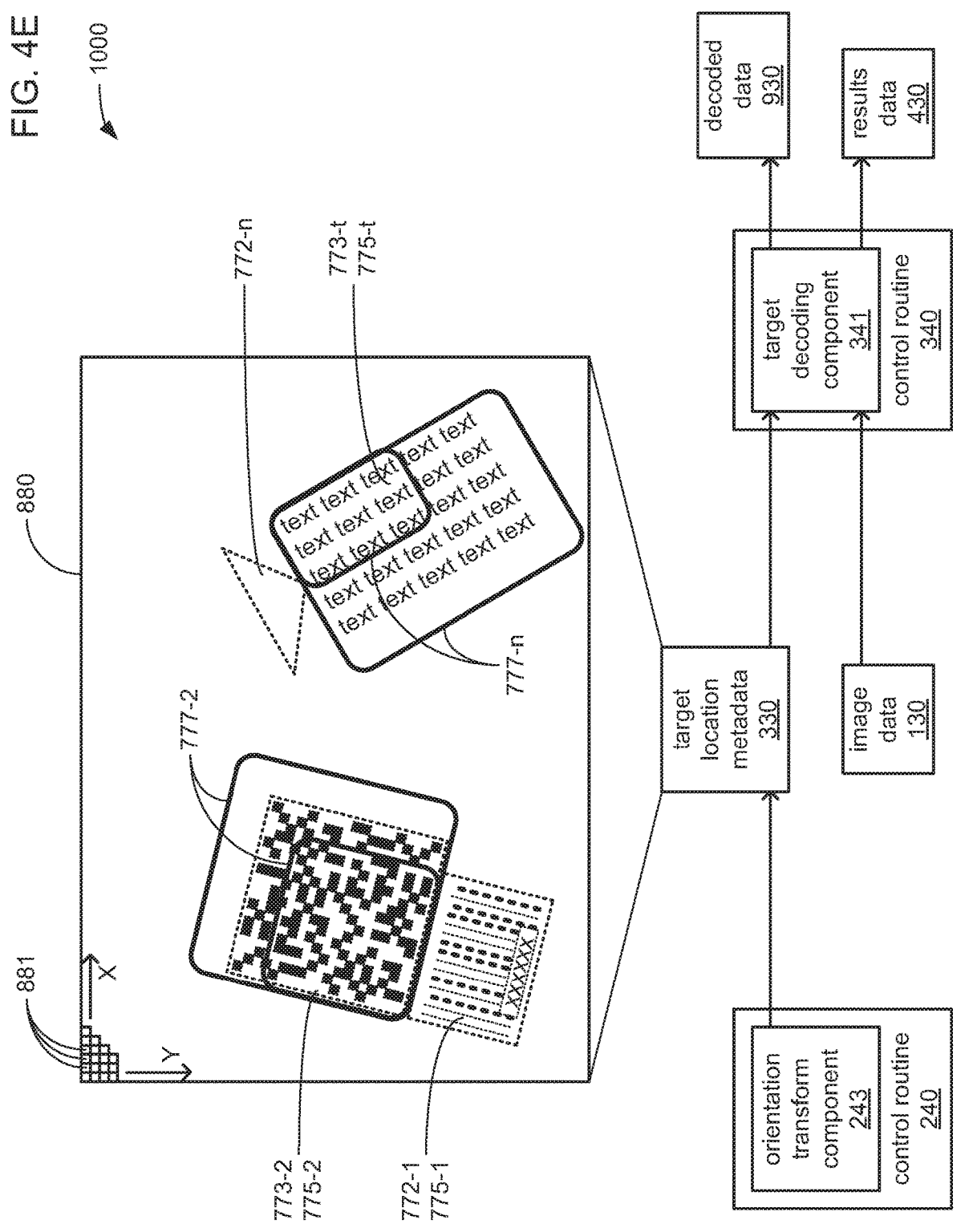

FIGS. 4A, 4B, 4C, 4D and 4E, together, depict aspects of an example of identification and decoding of encoded data markings 775 that are present within a captured image 880 by an implementation of the decoding system 1000 using the architecture of FIGS. 3A-C in greater detail. FIG. 4A depicts aspects of receiving image data 130 that includes data values for each pixel 881 of a captured image 880, and/or skew data 132 indicating a degree of skew of the plane of a surface of an object 700 relative to the plane of the captured image 880. FIG. 4B depicts aspects of analyzing the captured image 880 to identify the locations of anchor markings 772 within the captured image 880. FIGS. 4C-D, together, depict aspects of using the identified locations of anchor markings 772 within the captured image 880 to identify the locations of target markings 773 within the captured image 880. FIG. 4E depicts aspects of decoding target markings 773 at the identified locations to retrieve the encoded data.

It should be noted that, for the sake of simplicity of discussion, the performance of various functions with a single capture image 880 captured by a single camera 100 and stored as a single instance of image data 130 is depicted by and discussed in connection with FIGS. 4A-E. This should not be taken as limiting what is depicted and described herein to embodiments in which there is only a single captured image, or only a single camera to capture images, or only a single data structure used to store that captured image. Thus, what is depicted and described in connection with FIGS. 4A-E should be understood as applicable to embodiments in which there may be numerous captured images that may be captured by either a single or multiple cameras, and that may be stored within a single data structure or across multiple data structures (e.g., such as depicted in FIGS. 3B-C).

Turning to FIG. 4A, the image sensor 110 of a camera 100 of the decoding system 1000 may capture an image 880 in its FOV 117 of a label or portion 770 of an object 700 (see FIG. 2) that carries multiple markings that are visible within the captured image 880. More specifically, in this depicted example of a captured image 880 the visible markings include three encoded data markings 775: a 1D indicia 775-1 (e.g., a 1D barcode) that is of a type that has been selected to serve as an anchor marking 772-1; a 2D indicia 775-2 (e.g., a 2D barcode, such as a QR code) that is of a type that has been selected to be treated as a target marking 773-2; and a block of human-readable text 775-t (e.g., the text of an address label) that is also of a type that has been selected to be treated as a target marking 773-t. Another marking that is also visible in this depicted example of a captured image 880 is an anchor marking 772-n that is adjacent to the block of human-readable text 775-t, and that is not, itself, an encoded data marking 775. As will be explained in greater detail, the anchor marking 772-1 is to serve as a guide to locating the target marking 773-2, and the anchor marking 772-n is to serve as a guide to locating the target marking 773-t.

As will be familiar to those skilled in the art, at least in embodiments in which the image sensor 110 is implemented as a CCD or other type of light sensing device incorporating a 2D array of light sensing elements, the image sensor 110 may output a serial bitstream of values indicating the grayscale levels detected by separate ones of the light sensing elements of the pixels 881 of the captured image 880. As depicted, the order in which those grayscale values in the serial bitstream are output by the image sensor 110 may follow a left-to-right raster scan order within each horizontal row of pixels 881 (extending along the depicted horizontal axis X) of the captured image 880, starting with the top row and progressing row-by-row from top-to-bottom (progressing row-by-row along the vertical axis Y) of the captured image 880.

In some embodiments, the decoding system 1000 may be configured to trigger the camera 100 to capture an image of at least a portion of an object 700 in response to placement of the object 700 within its FOV 117 (see FIG. 2). Thus, there may be only the one captured image 880 captured by the image sensor 110 to be processed. Such triggering may be based on the output of a sensor (not shown) that detects the proximity of the object 700, and that is monitored by the decoding device 300, which may transmit a command to the camera 100 via the network 999 to trigger the capture of the single image 880. Alternatively, in other embodiments, the decoding system 1000 may be configured to cause the camera 100 to recurringly capture images 880 on a timed basis, such as at selected frame rate. Thus, at a recurring interval of time, the image sensor 110 of the camera 100 would capture a new image 880 to be processed, where each such image 880 may or may not include an image of an object 700 that carries any markings 772, 773 and/or 775, whatsoever. Regardless of whether the image sensor 110 captures only the single captured image 880 of the object 700, or multiple images 880 in a succession in which only a subset may include an image of the object 700, the bitstream received from the sensor 110 of the captured image(s) 880 as the image data 130 within the storage 360. More precisely, the grayscale values of the pixels 881 of the captured image(s) 880 may be stored by as the image data 130.

In some embodiments, the image sensor 110 of one or more cameras 100 may be a monochrome image sensor capable of capturing monochromatic images such that there is only a single grayscale value for each pixel 881. In such embodiments, each of the grayscale values may be a byte-wide (i.e., 8-bit) value that specifies an intensity level of a separate one of the pixels 881 (although grayscale values of greater or lesser bit width may also be used). However, in other embodiments, the image sensor 110 of one or more cameras 100 may be a color image sensor capable of capturing color images such that there may be multiple values for each pixel 881, including one or more grayscale values for each pixel 881. More precisely, in such other embodiments, a color space encoding scheme may be used in which the color of each pixel 881 is specified with multiple grayscale values that each specify a relative level of intensity of a different color component of the color, such as and not limited to, red-green-blue (RGB) or cyan-magenta-yellow-black (CMYK). RGB color space encoding often entails the allocation of 8, 12, 16, 24 or 32 bits per pixel to store the three grayscale values for the red, green and blue intensities. Alternatively, a color space encoding scheme may be used in which the color of each pixel 881 is specified with a single grayscale value that specifies an intensity level accompanied by one or more chrominance values that specify a color that is mapped to the one or more chrominance values, such as and not limited to, luminance-chrominance (YUV).

Therefore, as used herein, the term "grayscale value" is intended to denote the single value specifying the level of intensity of either a single monochromatic pixel 881 or a single color pixel 881, or is intended to denote one of the multiple grayscale values specifying the level of intensity of a color component of one of the color components that specify the color of a single pixel 881.

Turning to FIG. 4B, with the captured image 880 so stored as part of the image data 130, the processor 350 may be caused by execution of the instructions of the anchor identification component 242 to analyze the image 880 to search for any of variety of types of anchor markings 772 specified in the anchor-target database 270. Again, as discussed above, in some embodiments, it may be the one or more GPU components 353 and/or the one or more SIMD components 355 that are so caused to perform this analysis of the image 880.

The anchor-target database 270 may include multiple entries 277, and there may be a single entry 277 for each type of anchor marking 772 that is to be searched for within the captured image 880. Within each entry 277 may be anchor identification data 272 that may provide a specification of one or more characteristics of a particular type of anchor marking 772 (e.g., shape, visual elements of which it is made and/or is not made, colors of which it is made and/or is not made, etc.) to enable the identification of each instance of the particular type of anchor marking 772 that may be present within the captured image 880. Alternatively or additionally, the anchor identification data 272 may include an executable anchor identification routine that is to be executed by the processor 350 to perform the operations needed to locate each instance of the particular type of anchor marking 772 that may be present within the captured image 880. By way of example, where the particular type of anchor marking 772 is a 1D barcode (such as the anchor marking 772-1), the executable anchor identification routine may implement some form of the Saporetti transform (S-transform) to identify 1D barcodes by their characteristic parallel lines. The Saporetti transform is described in the earlier-mentioned U.S. Pat. No. 6,047,893 issued Apr. 11, 2000 to Claudio Saporetti, the disclosure of which is incorporated herein by reference for all purposes.

In some embodiments, performing the analysis of the captured image 880 to so identify the locations of anchor markings 772 may entail using multiple ones of the components 351, 353 and/or 355 of the processor 350 to search for instances of multiple different types of anchor marking 772 at least partially in parallel. In some of such embodiments, this may entail the execution of multiple ones of the anchor identification routines stored within multiple ones of the entries 277 of the anchor-target database 270. Such an analysis of the captured image 880 by the processor 350 may be guided by various rules specified in the rules data 210. By way of example, the rules data 210 may specify the number of anchor types to be searched for at least partially in parallel at a time and/or a prioritizing order of anchor types to be searched for. More specifically, in embodiments in which the search for more than one of the anchor types entails convolving one or more types of stencil about the pixels 881 of the captured image 880, the rules data 210 may specify various aspects of the manner in which a single convolving operation may be performed with one or more stencils associated with searching for multiple types of anchor marking 772 at a time.

Referring briefly to FIG. 4A in addition to FIG. 4B, regardless of the exact manner in which instances of each type of multiple types of anchor marking 772 are searched for and identified within the captured image 880, as each instance of a type of anchor marking 772 is so identified, an indication of its location within the captured image 880, an indication of its orientation relative to the X-Y coordinate system of the captured image 880, and/or an indication of the type of anchor marking 772 are stored as part of the anchor location metadata 230.

Turning to FIGS. 4C-D, the processor 350 may be caused by execution of the instructions of the orientation transform component 243 to employ such indications in the anchor location metadata 230, along with information retrieved from the anchor-target database 270 concerning corresponding types of anchor markings 772, in deriving locations of corresponding target markings 773 within the captured image 880. Again, as discussed above, in some embodiments, it may be the one or more GPU components 353 and/or the one or more SIMD components 355 that are so caused to perform this derivation of locations for target markings 773.

Again, the anchor-target database 270 may include a single entry 277 for each type of anchor marking 772 to be searched for within the captured image 880. Within each entry 277 may be a single target location model 273 or multiple target location models 273. Each target location model 273 corresponds to a single type of target marking 773 that the particular type of anchor marking 772 associated with an entry 277 serves as a guide to locating, and may include information specifying the type of target marking 773 that it corresponds to). Each target location model 273 specifies a location of its corresponding type of target marking relative to the type of anchor marking that corresponds to the entry 277 that includes the target location model 273. Thus, each type of anchor marking 772 may serve as a guide to identifying the location of a single corresponding type of target marking 773 (where its corresponding entry 277 includes a single target location model 273), or may serve as a guide to identifying the locations of multiple corresponding types of target markings 773 (where its corresponding entry 277 includes multiple target location models 273).

In some embodiments, the manner in which the location of a target marking 773 relative to an anchor marking 772 is specified may entail the use of a normalized U-V coordinate system for normalized pixel-like elements 785 that is separate and distinct from the X-Y coordinate system for the pixels 881 of the captured image 880. Thus, and referring briefly to FIG. 4A in addition to FIGS. 4C-D, the anchor-target database 270 may include an entry 277-12 that includes a target location model 273-2 that specifies the location of the type of target marking 773 of which the target marking 773-2 is an instance relative to the type of anchor marking 772 of which the anchor marking 772-1 is an instance in terms of coordinates or a difference in coordinates in the U-V coordinate system. Similarly, the anchor-target database 270 may also include an entry 277-nt that includes a target location model 273-t that also specifies the location of the type of target marking 773 of which the target marking 773-t is an instance relative to the type of anchor marking 772 of which the anchor marking 772-n is an instance in terms of coordinates or a difference in coordinates in the U-V coordinate system.

As those skilled in the art will readily recognize, depending on such numerous factors as the angle of spread of an FOV 117, the distance of the image sensor of a camera 100 from the label or portion 770 of an object 700 that carries a marking, the orientation of that marking on that label or portion 770, the angle of skew of the plane of that label or portion 770 relative to the plane of the image sensor 110 of that camera 100, the distance between that label or portion 770 and the image sensor 110, and/or still other factors, may cause that marking to appear in an image captured by that camera at potentially any orientation. Therefore, it is may be highly likely that a particular instance of an anchor marking 772 may be rotated into an orientation within the captured image 880 relative to the X-Y coordinate system, and/or that causes the plane in which the anchor marking 772 extends to not be parallel to the plane of the X-Y coordinate system.

Thus, in such embodiments, the defining and use of the normalized U-V coordinate system enables the locations of types of target markings 773 relative to types of anchor markings 772 to be specified in the target location models 273 with a coordinate system that is aligned with the pair of anchor marking 772 and target marking 773 that are associated with each separate target location model 273. In some of such embodiments, the size of the pixel-like elements 785 of the normalized U-V coordinate system may be configurable (e.g., by being specifiable as part of the rules data 210) based on such factors as the angle of spread of the FOV 117 of the camera 100 (or of the multiple cameras 100a-x), the expected distance of the image sensor 110 of the camera 100 (or of each of the cameras 100a-x) from the label or portion 770 of an object 700 that carries markings, the expected angle of skew of the plane of that label or portion 770 (if there can be an expected angle) relative to the plane of the image sensor 110 of that camera 100, and/or still other factors. In some of such embodiments, the size of the pixel-like elements 785 may be specified relative to the size of the pixels 881, such as by specifying a scaling factor by which the size of the pixel-like elements 785 is scaled to be larger or smaller in comparison to the size of the pixels 881.

In such embodiments, the processor 350 may be caused by execution of the orientation transform component to employ any of a variety of homography algorithms and/or other types of geometric transform to resolve such differences between the planes of the X-Y and U-V coordinate systems, and/or to resolve such differences in orientation between the directions in which the X-Y axes and the U-V axes extend, as part of translating locations between these two coordinate systems. By way of example, the following set of transforms may be employed to translate locations of pixel-like elements 785 within the U-V coordinate system to locations of pixels 881 within the X-Y coordinate system:

$$\begin{bmatrix} X \\ Y \end{bmatrix} = \begin{bmatrix} U \cdot S \cdot \cos(\bullet) + V \cdot S \cdot \sin(\bullet) + d_X \\ -U \cdot S \cdot \sin(\bullet) + V \cdot S \cdot \cos(\bullet) + d_Y \end{bmatrix}$$

in which S is the scale of the pixel-like elements 785 relative to the pixels 881, •is the angle of rotation of an instance of an anchor marking 773 identified in the captured image 880 relative to the X-Y coordinate system, and both $d_X$ and $d_Y$ are translational terms.

Regardless of the exact manner in which locations of target markings 773 are specified by the target location models 273 within the entries 277 of the anchor-target database 270, and regardless of the exact manner in which the anchor location metadata 230 and the target location models 273 may be used to determine the location of each instance of each type of target marking 773 that may be present within the captured image 880, as those locations are derived, an indication of each such location within the captured image 880 and/or an indication of the type of target marking 773 are stored as part of the target location metadata 330.

As previously discussed, in some embodiments, machine learning may be employed in refining the derivation of locations of each instance of target marking 773 that may be present within the captured image 880. In such embodiments, each target location model 273 within each entry 277 of the anchor-target database 270 may be accompanied by corresponding location score(s) 274 that provide an indication of a degree of probability that an instance of the corresponding type of target marking 773 will be found at the location specified by that target location model 273. In some of such embodiments, there may be a single probability score for the location specified by each target location model 273. In other embodiments, there may be a separate probability score for each pixel-like element 785 that falls within and/or near the location specified by each target location model 273.

Regardless of the exact manner in which one or more probability score is associated with the location specified by each target location model 273, and as will be explained in greater detail, the probability scores are determined (at least over time) based on successes and/or lack of success in past attempts made to interpret instances of target markings 773 at locations that were derived using the target location model 273 in previous captured images. More precisely, where a target location model 273 is used to derive the location of an instance of the corresponding type of target marking 773 within a previous captured image, the probability score associated with the location specified within the target location model 273 within the normalized U-V coordinate system (or the scores for the pixel-like elements 785 associated with that specified location within the normalized UV coordinate system) may be adjusted based on the success or failure of an attempt to interpret a target marking 773 of that type at that location specified in that previous captured image.

In some embodiments, the machine learning algorithm employed may entail the use of a combination of exploitation where locations of instances of target markings 773 are based on such histories of successes and failures in interpreting target markings 773, and exploration in which additional locations of instances of target markings 773 are randomly specified to cause the performance of exploratory attempts at interpreting target markings 773 in an effort to identify new locations that have not been previously considered. More precisely, one or more randomly generated locations at which an instance of a type of target marking 773 relative to the corresponding instance of a corresponding anchor marking 772 may be added to the target location metadata 330 to cause the occurrence of such exploratory attempts at interpreting that type of target marking 773. In some of such embodiments, the degree of exploration vs. exploitation that is performed may be specified in the rules data 210.

In some of such embodiments, the decoding device 300 of the decoding system 1000 may be provided with the anchor-target database 270 in a condition that includes target location models 273 that each include an initial specification of a location of a corresponding type of target marking 773. This may be done in an effort to speed the initial learning process in preparing the decoding system 1000 for use. However, as previously discussed, at least some aspects of the specification of locations of target markings 773 by the target marking models 273 may be dependent upon various factors associated with various details of the camera 100 and/or of the positioning of the camera 100 (or each one of the multiple cameras 100a-x). Thus, the provision of an initial specification in each target location model 273 of the location of a corresponding type of target marking 773 may paradoxically increase the amount of time required for the initial learning process as incorrect specifications of location within the target locations models 273 must be "unlearned" while more correct specifications of such locations that are based on the factors associated with a particular installation of the camera 100 (or of the multiple cameras 100a-x) are learned.

It should be noted that, in some of such embodiments the use of such a machine learning algorithm may be limited to certain pre-selected conditions such that it is not enabled otherwise. By way of example, it may be that machine learning is enabled at a pre-installation phase during which the machine learning features of the decoding system 1000 are being tested and/or during which learning is conducted under a set of pre-selected conditions in which a pre-selected combination of encoded data markings are used at pre-selected distances within FOVs of pre-selected angle of spread to cause the generation of a set of target location models 273 that may be deemed to be optimal or otherwise deemed to be preferred. Following such a pre-installation phase, the machine learning features may then be disabled such that no learning is allowed to occur during normal operation where the decoding system 1000 is ultimately installed for use. By way of another example, it may be that machine learning is disabled at a pre-installation phase during which features of the decoding system other than machine learning are being tested to avoid causing the learning of target location models 273 during such testing that would have to later be "unlearned" during normal operation where the decoding system 1000 is ultimately installed.

Turning to FIG. 4E, the processor 350 may be caused by execution of the instructions of the target decoding component 341 to employ such indications in the target location metadata 330 to attempt the interpretation of instances of various types of target markings 773 at each location specified in the target location metadata 330. As discussed above, in some embodiments, it may be the one or more core components 351 that are so caused to perform these attempts at interpretation.

As depicted in FIG. 4E, and continuing with the example set of markings 772-1, 773-2, 772-n and 773-t originally introduced in FIG. 4A as part of the example captured image 880, the target location metadata 330 may specify the locations of the target marking 773-2 as a rectangular region 777-2 and of the target marking 773-t as a rectangular region 777-t. As depicted, the rectangular regions 777-2 and 777-t may be oriented to match the orientations of the anchor markings 772-1 and 772-n, respectively. In other embodiments, such rectangular regions may be oriented to align their sides with the axes X and Y of the X-Y coordinate system of the captured image 880. However, in still other embodiments, the locations of the target markings 773-2 and 773-t may each be specified in the target location metadata 330 as a set of particular ones of the pixels 881 that may or may not be contiguous.

The exact manner in which the location of each of the target markings 773-2 and 773-t is specified may be selected based on aspects of the various interpretation algorithms that may be used to make the attempt to interpret each of the possible types of target marking 773 that may be present within the captured image 880. By way of example, where an interpretation algorithm entails the use of a stencil that is convolved about a region of pixels, then the specification of locations of instances of target markings 773 may be with rectangular regions to define a specific region in which such convolving is to occur. However, and as depicted in FIG. 4E, such a rectangular region may, due to a preselected scaling value, be either larger or smaller than the actual portion of the captured image 880 that is covered by its corresponding target marking 773.

To accommodate the possibility that the target location metadata 330 may specify a region (whether rectangular, or as a set of pixels) that does not encompass all of an instance of a target marking 773, the processor 350 may be caused by the target decoding component 341 to perform some amount of "padding" of the specified region (again, whether rectangular, or as a set of pixels) to increase its size within the captured image 880 beyond what is specified in the target location metadata 330 to increase the likelihood of a successful interpretation of the corresponding target marking 773, thereby leading to a successful decode of the data encoded therein.

Regardless of the exact manner in which each location of an instance of a target marking 773 is specified in the target location metadata 330, and regardless of the exact manner in which such specifications may be padded and/or otherwise modified to increase the likelihood of success in attempted interpretation, any successfully decoded data may be stored as part of the decoded data 930. The processor 930 may then be caused to operate the network interface 390 to transmit to another device (e.g., the server 900) via the network 999. Thus, presuming that the interpretation of the example target markings 773-2 and 773-t of this example captured image 880 is successful such that the data encoded within each is successfully decoded, such decoded data from both may be stored as part of the decoded data 930.

However, as previously discussed, at least a subset of types of anchor markings 772 that may be present within a captured image may also be encoded data markings 775 that may encode data that may be sought to be decoded. More specifically, as previously discussed, the anchor marking 772-1 in this example captured image 880 is also an encoded data marking 775-1, while the other anchor marking 772-n is not. In some embodiments, as a mechanism to trigger an attempt at interpreting anchor markings 772 that are also encoded data markings 775, the processor may have been caused by its execution of the orientation transform component 243 to include indications of the location and type of each instance of such anchor markings 772 in the target location metadata 330. Alternatively, in other embodiments, in executing the instructions of the target decoding component 341, the processor may be caused to attempt to interpret both instances of target markings 773 at locations specified in the target location metadata 330 and instances of anchor markings 772 that are also encoded data markings 775 at locations specified in the anchor location metadata 230.

In addition to the storage of successfully decoded data as part of the decoded data 930, the processor 350 may also be caused to store, as part of the results data 430, indications of which attempts at interpreting an instance of a target marking 773 at a location specified in the target location metadata 330 were successful, and/or which of such attempts were not. Alternatively or additionally, the processor 350 may be caused to store, within the results data 430, indications of which pixels 881 of the captured image 880 were found to be covered by an instance of a target marker 773 that was successfully decoded, and which pixels 881 were not.

Figure 5:
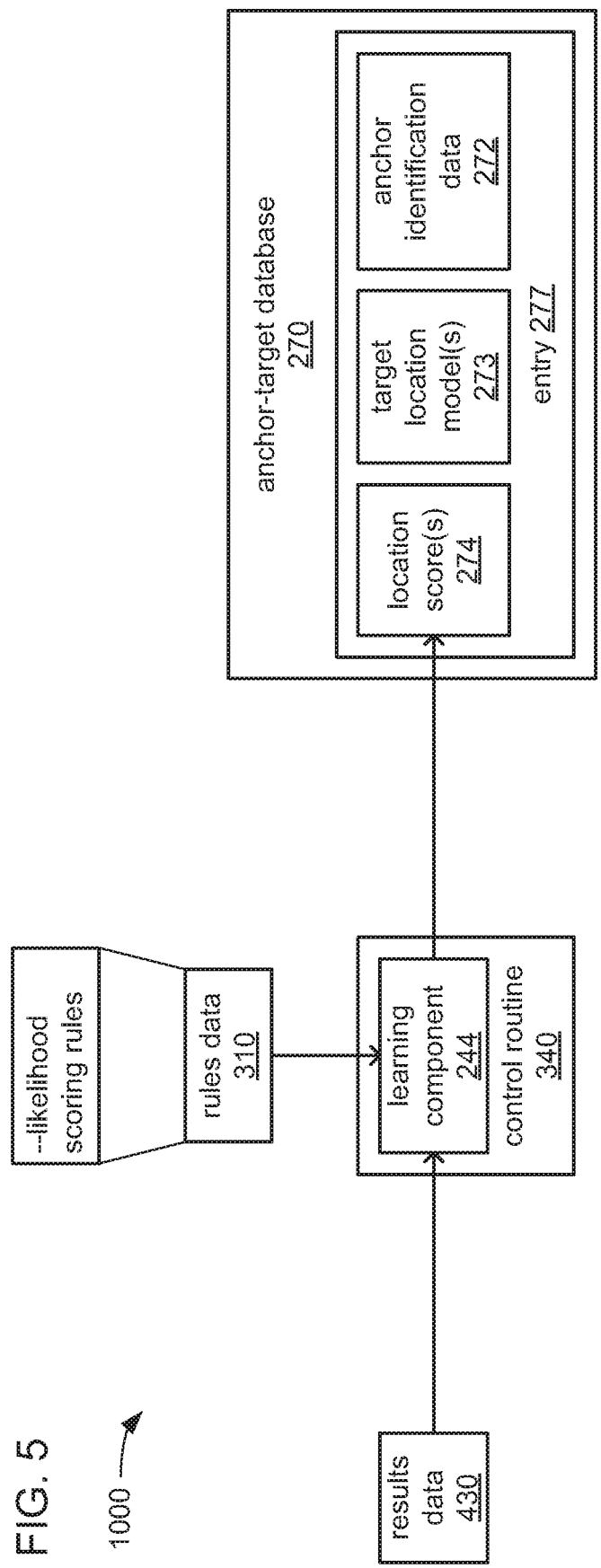
FIG. 5 shows aspects of using machine learning to refine the identification of locations of target markings within a captured image.

FIG. 5 depicts aspects of an example of implementing machine learning through the assignment of scores to identification and decoding of encoded data markings 775 that are present within a captured image 880 by an implementation of the decoding system 1000 using the architecture of FIGS. 3A-C in greater detail. FIG. 4A depicts aspects of receiving image data 130 that includes data values for each pixel 881 of a captured image 880, and/or skew data 132 indicating a degree of skew of the plane of a surface of an object 700 relative to the plane of the captured image 880. FIG. 4B depicts aspects of analyzing the captured image 880 to identify the locations of anchor markings 772 within the captured image 880. FIGS. 4C-D, together, depict aspects of using the identified locations of anchor markings 772 within the captured image 880 to identify the locations of target markings 773 within the captured image 880. FIG. 4E depicts aspects of decoding target markings 773 at the identified locations to retrieve the encoded data.

At least in embodiments in which the location scores 274 are each for one of the pixel-like elements 785, and where the results data 430 data specifies individual ones of the pixels 881 at which there was an instance of a target marking 773 that was able to be successfully interpreted to decode its data, the following set of transforms may be employed to translate locations of pixels 881 within the X-Y coordinate system to locations of pixel-like elements 785 within the U-V coordinate system:

$$\begin{bmatrix} U \\ V \end{bmatrix} = \begin{bmatrix} (1/S)\,[(X-d_X)\cos(\bullet) - (Y-d_Y)\sin(\bullet)] \\ (1/S)\,[(X-d_X)\sin(\bullet) - (Y-d_Y)\cos(\bullet)] \end{bmatrix}$$

Any of a variety of scoring systems may be used, including scoring systems with numerical values in which the higher or lower magnitude value and/or in which a positive vs. negative value is indicative of higher probability of success in being able to interpret an instance of a target marking 273 within a specified region or at the location of a particular pixel-like element 785.

Figure 6A:
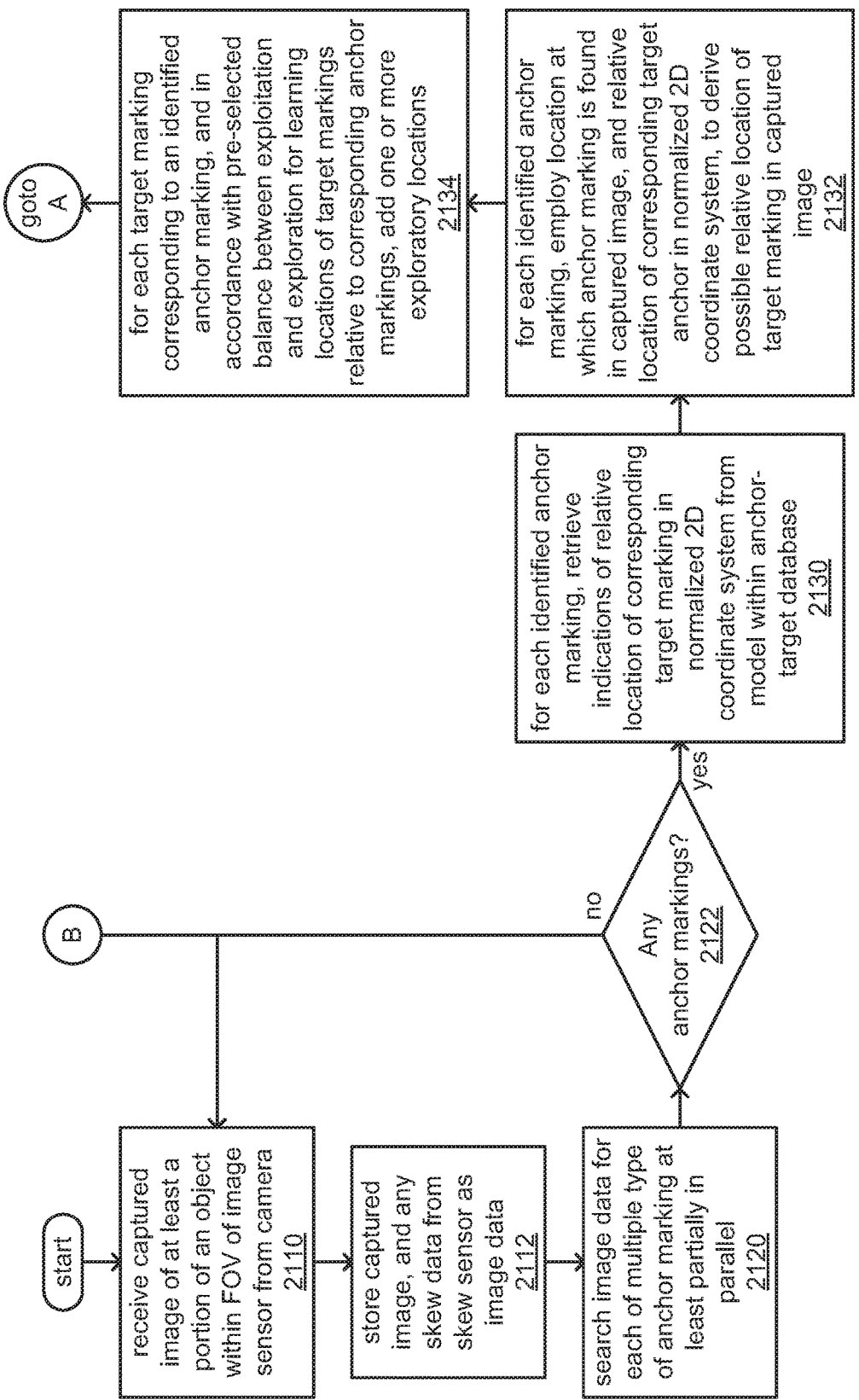

FIGS. 6A and 6B, together, provide a flowchart 2100 depicting aspects of operation of the decoding system 1000. More specifically, FIGS. 6A-B depict aspects of operations performed by at least one processor 350 of the decoding device 300 under the control of instructions of the control routines 240 and/or 340.

At 2110, an image sensor of a camera of a decoding system (e.g., the image sensor 110 of the camera 100 of the decoding system 1000) captures an image of at least a portion of an object within its FOV (e.g., the captured image 880 of at least a label or portion of the object 700 within the FOV 117). At 2112, at least one processor of a decoding device of the decoding system (e.g., the at least one processor 350 of the decoding device 300) may store the captured image within a storage of the decoding device as image data (e.g., the image data 130 within the storage 360).

At 2120, the processor may search the image data representing the captured image may for any instances of multiple types of anchor marking, and may do so at least partially in parallel. More specifically, components of the processor, such GPU and/or SIMD components, may be employed in executing multiple anchor marking search algorithms (e.g., the one or more GPU components 353 and/or the one or more SIMD components 355 executing multiple anchor identification routines stored within the entries 277 of the anchor-target database 270) to perform such at least partially parallel searching.

At 2122, a check may be made as to whether any anchor markings, at all, were identified within the captured image. If not, then the processor may proceed to receiving another captured image at 2110.

However, if at least one instance of at least one type of anchor marking was identified with the captured image at 2122, then at 2130, the processor may, for each instance of a type of anchor marking that is found to be present (e.g., instances of a type of anchor marking 772), retrieve indications from a database or other data structure of a relative location of at least one corresponding type of target marking (e.g., a type of target marking 773) that is specified in a normalized 2D coordinate system (e.g., the U-V coordinate system depicted and discussed in connection with FIGS. 4A-E).

At 2132, for each instance of a type of anchor marking that is identified as present within the captured image, the processor may be caused to employ the location at which that instance is found within the captured image, along with the retrieved indication of the relative location of a corresponding type of target marking within the normalized 2D coordinate system, to derive a possible relative location of an instance of that type of target marking within the captured image.

At 2134, for each instance of a target marking that corresponds to an identified instance of an anchor marking, the processor may be caused to generate one or more exploratory locations within the captured image in addition to its derived location. In so doing, the processor may generate such exploratory locations randomly, and may limit the overall quantity of exploratory locations to be specified within the captured image based on a pre-selected balance between exploitation of previously gained knowledge of locations at which instances of target markings have been found and successfully decoded, and exploration of new locations as part of identifying instances of target markings that are able to be decoded at previously unconsidered locations.

At 2140, for each instance of a target marking that corresponds to an identified instances of an anchor marking, attempt a performance of interpretation thereof at the location that has been derived therefor, and at any exploratory location that has been randomly generated therefor.

At 2142, a check may be made as to whether any target markings, at all, were successfully interpreted such that encoded data was successfully decoded therefrom at any location within the captured image. If not, then at 2146, the processor may, for each identified anchor marking, employ any of a variety of machine learning algorithms to update the model from which a location within the captured image was derived for an instance of a corresponding target marking based on the results of the attempt to interpret the corresponding instance of target marking at that derived location, and at any exploratory location therefor. The processor may then proceed to receiving another captured image at 2110.

However, if there was at least one instance of a target marking was able to be successfully interpreted at 2142 such that data encoded therein was able to be successfully decoded, then at 2150, the decoded data is transmitted to another device via a network (e.g., the server 900 via the network 999).

At 2160, a check may be made as to whether it was possible to attempt interpretations of instances of target markings at all of the derived and exploratory locations within the time available to process the captured image before processing of another captured image must begin, such that there are no locations left at which such interpreting is to be attempted. If no such locations remain, then the processor may update the corresponding models at 2146 before receiving the next captured image at 2110.

However, if there remains one or more locations at which an interpretation of an instance of a type of target marking has not yet been attempted at 2160, then at 2162, the processor may store an indication of such location(s) along with indications of the type of target marking(s) for which attempts at interpretation have as yet to be made at those stored location(s). The processor may then update the corresponding models at 2146 before receiving the next captured image at 2110.

There is thus disclosed a system to capture and decode encoded data. The features set forth below may be combined in any of a variety of ways to create any of a variety of embodiments of a decoding device, a decoding system and/or a method of decoding data encoded within encoded data markings.

A decoding device includes storage configured to store image data received from a camera of a captured image that is captured by the camera, wherein the captured image includes a two-dimensional (2D) array of pixels that define a 2D captured image coordinate system, and a processor coupled to the decoding storage. The processor is configured to: analyze the image data to identify an instance of a type of anchor marking at a location within the captured image coordinate system, and to derive an orientation of the instance of the type of anchor marking relative to the captured image coordinate system; correlate the type of anchor marking to a relative location of a corresponding type of target marking to the type of anchor marking within a 2D normalized coordinate system; employ the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; perform an attempt at interpretation of the instance of the type of target marking at the derived location within the captured image coordinate system to decode data encoded within the instance of the type of target marking; and in response to a successful decode of the data, transmit the data to a server via a network.

The relative location of the type of target marking to the type of anchor marking within the normalized coordinate system may be indicated by a model generated by training the decoding device. The processor may be further configured to, in response to at least one of the successful decode of the data and an unsuccessful decode of the data, update the indication within the model of the relative location of the type of target marking to the type of anchor marking within the normalized coordinate system.

The processor may be further configured to: generate one or more exploratory locations within the captured image coordinate system based on a preselected balance of exploitation and exploration of relative locations of the type of target marking to the type of anchor marking within the normalized coordinate system; perform an attempt at interpretation of the instance of the type of target marking within the captured image at each exploratory location of the one or more exploratory locations to decode the data encoded within the instance of the type of target marking thereat; and update the indication within the model of the relative location of the type of target marking to the type of anchor marking based on whether the decode of the data at the derived location and at each exploratory location of the one or more exploratory locations was successful or was unsuccessful.

Skew data indicative of a degree of skew of a surface of an object that carries the instance of the type of anchor marking relative to the camera may be received with the image data, and the processor may be further configured to employ the skew data to derive the orientation of the instance of the type of anchor marking relative to the captured image coordinate system.

The type of anchor marking may include one type of anchor marking of multiple types of anchor marking, and the type of target marking may include one type of target marking of multiple types of target marking. The processor may be further configured to: analyze the image data to search for instances of each type of anchor marking of the multiple types of anchor marking within the captured image. For each instance of a type of anchor marking of the multiple types of anchor marking that is identified as present within the image, the processor may be further configured to: identify the location and the orientation of the instance of the type of anchor marking within the captured image coordinate system; correlate the type of anchor marking to a corresponding type of target marking of the multiple types of target marking and a relative location of the corresponding type of target marking to the type of anchor marking within the normalized coordinate system; and employ the location of the instance of the type of anchor marking within the captured image coordinate system, the orientation of the instance of the type of anchor marking relative to the captured image coordinate system, and the relative location of the corresponding type of target marking to the type of anchor marking within the normalized coordinate system to derive a location of a corresponding instance of the corresponding type of target marking within the captured image coordinate system. For each instance of a type of target marking of the multiple types of target marking that corresponds to an instance of a type of anchor marking of the multiple types of anchor marking that is identified as present within the image, the processor may be further configured to: perform an attempt at interpreting the instance of the type of target marking at the derived location within the captured image coordinate system to decode corresponding data encoded within the instance of the corresponding type of target marking; and in response to a successful decode of the corresponding data, transmit the corresponding data to the server via the network.

The processor may be further configured to analyze the image data to search for the multiple types of anchor marking within the captured image at least partially in parallel.

The type of anchor marking may include a one-dimensional (1D) barcode and the target marking may include a 2D barcode.

The type of target marking may include printed text, and the performance of the attempt at interpretation of the instance of the type of target marking may include a performance of optical character recognition by the processor.

A decoding system includes: multiple cameras, wherein each camera includes an image sensor configured to capture an image of multiple captured images and each captured image of the multiple captured images includes a two-dimensional (2D) array of pixels that define a 2D captured image coordinate system; and a processor coupled to the multiple cameras. The processor is configured, for each captured image of the multiple captured images, to: analyze the captured image to identify an instance of a type of anchor marking at a location within the captured image coordinate system, and to derive an orientation of the instance of the type of anchor marking relative to the captured image coordinate system; correlate the type of anchor marking to a relative location of a corresponding type of target marking to the type of anchor marking within a 2D normalized coordinate system; employ the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; perform an attempt at interpretation of the instance of the type of target marking at the derived location within the captured image coordinate system to decode of data encoded within the instance of the type of target marking; and in response to a successful decode of the data, transmit the data to a server via a network.

For each captured image of the multiple captured images: the relative location of the type of target marking to the type of anchor marking within the normalized coordinate system may be indicated by a separate model generated by training the decoding system for each camera of the multiple cameras; and the processor may be further configured to, in response to at least one of the successful decode of the data and an unsuccessful decode of the data, update the indication of the relative location of the type of target marking to the type of anchor marking within the normalized coordinate system within the model that corresponds to the camera of the multiple cameras that captured the captured image.

For each captured image of the multiple captured images, the processor may be further configured to: generate one or more exploratory locations within the captured image coordinate system based on a preselected balance of exploitation and exploration of relative locations of the type of target marking to the type of anchor marking within the normalized coordinate system; perform an attempt at interpretation of the instance of the type of target marking within the captured image at each exploratory location of the one or more exploratory locations to decode the data encoded within the instance of the type of target marking thereat; and update the indication of the relative location of the type of target marking to the type of anchor marking within the model that corresponds to the camera of the multiple cameras that captured the captured image based on whether the decode of the data at the derived location and at each exploratory location of the one or more exploratory locations was successful or was unsuccessful.

The decoding system may further include multiple skew sensors, wherein: each skew sensor of the multiple skew sensors corresponds to a camera of the multiple cameras; for each camera of the multiple cameras, the corresponding skew sensor of the multiple skew sensors detects a degree of skew of a surface of an object that carries the instance of the type of anchor marking in the corresponding captured image relative to the camera; and the processor is further configured, for each captured image of the multiple captured images, to employ the degree of skew relative to the corresponding camera to derive the orientation of the instance of the type of anchor marking relative to the captured image coordinate system of the corresponding captured image.

For each captured image of the multiple captured images, the type of anchor marking may include one type of anchor marking of multiple types of anchor marking and, the type of target marking may include one type of target marking of multiple types of target marking. The processor may be further configured to analyze the image data to search for instance of each type of anchor marking of the multiple types of anchor marking within the captured image. For each instance of a type of anchor marking of the multiple types of anchor marking that is identified as present within the image, the processor may be further configured to: identify the location and the orientation of the instance of the type anchor marking within the captured image coordinate system; correlate the type of anchor marking to a corresponding type of target marking of the multiple types of target marking and a relative location of the corresponding type of target marking to the type of anchor marking within the normalized coordinate system; and employ the location of the instance of the type of anchor marking within the captured image coordinate system, the orientation of the instance of the type of anchor marking relative to the captured image coordinate system, and the relative location of the corresponding type of target marking to the type of anchor marking within the normalized coordinate system to derive a location of a corresponding instance of the corresponding type of target marking within the captured image coordinate system. For each instance of a type of target marking of the multiple types of target marking that corresponds to an instance of a type of anchor marking of the multiple types of anchor marking that is identified as present within the image, the processor may be further configured to: perform an attempt at interpreting the instance of the type target marketing at the derived location within the captured image coordinate system to decode corresponding data encoded within the instance of the corresponding type of target marking, and in response to a successful decode of the corresponding data, transmit the corresponding data to the server via the network.

The processor may include at least one of multiple single-instruction-multiple-data (SIMD) components or at least one of multiple graphics processing unit (GPU) components; the processor may include at least one core component; the processor may be configured to employ the at least one SIMD component or the at least one GPU component to analyze the multiple captured images at least partially in parallel to identify each instance of the type of anchor marking in each image of the multiple captured images; and the processor may be configured to employ the at least one core component to perform the attempts at interpretation.

A method for decoding data encoded within encoded data markings includes: receiving, at a decoding device, image data from a camera of a captured image captured by the camera, wherein the captured image includes a two-dimensional (2D) array of pixels that define a 2D captured image coordinate system; analyzing, by a processor of the decoding device, the image data to identify an instance of an anchor marking at a location within the captured image coordinate system, and to derive an orientation of the instance of the type of anchor marking to the captured image coordinate system; correlating the type of anchor marking to a relative location of a corresponding type of target marking to the type of anchor marking within a 2D normalized coordinate system; employing, by the processor, the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system; performing, by the processor, an attempt at interpretation of the instance of the target marking at the derived location within the captured image coordinate system to decode data encoded within the instance of the type of target marking; and in response to a successful decode of the data, transmitting the data to a server via a network.

The relative location of the type of target marking to the type of anchor marking within the normalized coordinate system may be indicated by a model generated by training the decoding device; and the method may include, in response to at least one of the successful decode of the data and an unsuccessful decode of the data, updating, by the processor, the indication within the model of the relative location of the type of target marking to the type of anchor marking within the normalized coordinate system.

The method may include: generating, by the processor, one or more exploratory locations within the captured image coordinate system based on a preselected balance of exploitation and exploration of relative locations of the type of target marking to the type of anchor marking within the normalized coordinate system; performing, by the processor, an attempt at interpretation of the instance of the type of target marking within the captured image at each exploratory location of the one or more exploratory locations to decode the data encoded within the instance of the type of target marking thereat; and updating, by the processor, the indication within the model of the relative location of the type of target marking to the type of anchor marking based on whether the decode of the data at the derived location and at each exploratory location of the one or more exploratory locations was successful or unsuccessful.

The method may include: receiving, at the decoding device, and with the image data, skew data indicative of a degree of skew of a surface of an object that carries the instance of the type of anchor marking relative to the camera; and employing, by the processor, the skew data to derive the orientation of the instance of the type of anchor marking relative to the captured image coordinate system.

The type of anchor marking may include one type of anchor marking of multiple types of anchor marking, and the type of target marking may include one type of target marking of multiple types of target marking. The method may include analyzing, by the processor, the image data to search for each type of anchor marking of the multiple types of anchor marking within the captured image. The method may include, for each instance of a type of anchor marking of the multiple types of anchor marking that is identified as present within the image, performing operations including: identifying, by the processor, the location and the orientation of the instance of the type of anchor marking within the captured image coordinate system; correlating the type of anchor marking to a corresponding type of target marking of the multiple types of target marking and a relative location of the corresponding type of target marking to the type of anchor marking within the normalized coordinate system; and employing, by the processor, the location of the instance of the type of anchor marking within the captured image coordinate system, the orientation of the instance of the type of anchor marking relative to the captured image coordinate system, and the relative location of the corresponding type of target indicia to the type of anchor marking within the normalized coordinate system to derive a location of a corresponding instance of the corresponding type of target marking within the captured image coordinate system. The method may include, for each instance of a type of target marking of the multiple types of target marking that corresponds to an instance of the type of anchor marking of the multiple type of anchor marking that is identified as present within the image, performing operations including: performing, by the processor, an attempt at interpreting the instance of the type of target marking at the derived location within the captured image coordinate system to decode corresponding data encoded within the instance of the corresponding type of target marking; and in response to a successful decode of the corresponding data, transmitting the corresponding data to the server via the network.

The method may include analyzing, by the processor, the image data to search for the multiple types of anchor marking within the captured image at least partially in parallel.

The invention claimed is:

1. A decoding device comprising:
   storage configured to store image data received from a camera of a captured image that is captured by the camera, wherein the captured image comprises a two-dimensional (2D) array of pixels that define a 2D captured image coordinate system; and
   a processor coupled to the decoding storage, the processor configured to:
   analyze the image data to identify an instance of a type of anchor marking at a location within the captured image coordinate system, and to derive an orientation of the instance of the type of anchor marking relative to the captured image coordinate system;
   correlate the type of anchor marking to a relative location of a corresponding type of target marking to the type of anchor marking within a 2D normalized coordinate system;
   employ the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system;
   perform an attempt at interpretation of the instance of the type of target marking at the derived location within the captured image coordinate system to decode data encoded within the instance of the type of target marking; and in response to a successful decode of the data, transmit the data to a server via a network;

analyze the image data to search for instances of each type of anchor marking of the multiple types of anchor marking within the captured image;

for each instance of a type of anchor marking of the multiple types of anchor marking that is identified as present within the image, the processor is further configured to:

identify the location and the orientation of the instance of the type of anchor marking within the captured image coordinate system;

correlate the type of anchor marking to a corresponding type of target marking of the multiple types of target marking and a relative location of the corresponding type of target marking to the type of anchor marking within the normalized coordinate system; and employ the location of the instance of the type of anchor marking within the captured image coordinate system, the orientation of the instance of the type of anchor marking relative to the captured image coordinate system, and the relative location of the corresponding type of target marking to the type of anchor marking within the normalized coordinate system to derive a location of a corresponding instance of the corresponding type of target marking within the captured image coordinate system; and for each instance of a type of target marking of the multiple types of target marking that corresponds to an instance of a type of anchor marking of the multiple types of anchor marking that is identified as present within the image, the processor is further configured to:

perform an attempt at interpreting the instance of the type of target marking at the derived location within the captured image coordinate system to decode corresponding data encoded within the instance of the corresponding type of target marking; and in response to a successful decode of the corresponding data, transmit the corresponding data to the server via the network, wherein:

the type of anchor marking comprises one type of anchor marking of multiple types of anchor marking; and the type of target marking comprises one type of target marking of multiple types of target marking.

2. The decoding device of claim 1, wherein:

the relative location of the type of target marking to the type of anchor marking within the normalized coordinate system is indicated by a model generated by training the decoding device; and the processor is further configured to, in response to at least one of the successful decode of the data and an unsuccessful decode of the data, update the indication within the model of the relative location of the type of target marking to the type of anchor marking within the normalized coordinate system.

3. The decoding device of claim 2, wherein the processor is further configured to:

generate one or more exploratory locations within the captured image coordinate system based on a prese-lected balance of exploitation and exploration of relative locations of the type of target marking to the type of anchor marking within the normalized coordinate system;

perform an attempt at interpretation of the instance of the type of target marking within the captured image at each exploratory location of the one or more exploratory locations to decode the data encoded within the instance of the type of target marking thereat; and update the indication within the model of the relative location of the type of target marking to the type of anchor marking based on whether the decode of the data at the derived location and at each exploratory location of the one or more exploratory locations was successful or was unsuccessful.

4. The decoding device of claim 1, wherein:

skew data indicative of a degree of skew of a surface of an object that carries the instance of the type of anchor marking relative to the camera is received with the image data; and the processor is further configured to employ the skew data to derive the orientation of the instance of the type of anchor marking relative to the captured image coordinate system.

5. The decoding device of claim 1, wherein the processor is further configured to analyze the image data to search for the multiple types of anchor marking within the captured image at least partially in parallel.

6. The decoding device of claim 1, wherein the type of anchor marking comprises a one-dimensional (1D) barcode and the target marking comprises a 2D barcode.

7. The decoding device of claim 1, wherein:

the type of target marking comprises printed text; and the performance of the attempt at interpretation of the instance of the type of target marking comprises a performance of optical character recognition by the processor.

8. The decoding system of claim 1, wherein the anchor marking includes at least one of a 1D barcode, a 2D barcode, a digital watermark, or a human-readable text.

9. The decoding system of claim 8, wherein the target marking includes at least one of a 1D barcode or a 2D barcode.

10. A decoding system comprising:

multiple cameras, wherein:

each camera comprises an image sensor configured to capture an image of multiple captured images; and each captured image of the multiple captured images comprises a two-dimensional (2D) array of pixels that define a 2D captured image coordinate system; and a processor coupled to the multiple cameras, the processor configured, for each captured image of the multiple captured images, to:

analyze the captured image to identify an instance of a type of anchor marking at a location within the captured image coordinate system, and to derive an orientation of the instance of the type of anchor marking relative to the captured image coordinate system;

correlate the type of anchor marking to a relative location of a corresponding type of target marking to the type of anchor marking within a 2D normalized coordinate system;

employ the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system;

generate one or more exploratory locations within the captured image coordinate system based on a preselected balance of exploitation and exploration of relative locations of the type of target marking to the type of anchor marking within the normalized coordinate system;

perform an attempt at interpretation of the instance of the type of target marking within the captured image at each exploratory location of the one or more exploratory locations to decode the data encoded within the instance of the type of target marking thereat;

update the indication within the model of the relative location of the type of target marking to the type of anchor marking based on whether the decode of the data at the derived location and at each exploratory location of the one or more exploratory locations was successful or was unsuccessful;

perform an attempt at interpretation of the instance of the type of target marking at the derived location within the captured image coordinate system to decode of data encoded within the instance of the type of target marking; and in response to a successful decode of the data, transmit the data to a server via a network.

11. The decoding system of claim 10, wherein, for each captured image of the multiple captured images:

the relative location of the type of target marking to the type of anchor marking within the normalized coordinate system is indicated by a separate model generated by training the decoding system for each camera of the multiple cameras; and the processor is further configured to, in response to at least one of the successful decode of the data and an unsuccessful decode of the data, update the indication of the relative location of the type of target marking to the type of anchor marking within the normalized coordinate system within the model that corresponds to the camera of the multiple cameras that captured the captured image.

12. The decoding system of claim 10, further comprising multiple skew sensors, wherein:

each skew sensor of the multiple skew sensors corresponds to a camera of the multiple cameras;

for each camera of the multiple cameras, the corresponding skew sensor of the multiple skew sensors detects a degree of skew of a surface of an object that carries the instance of the type of anchor marking in the corresponding captured image relative to the camera; and the processor is further configured, for each captured image of the multiple captured images, to employ the degree of skew relative to the corresponding camera to derive the orientation of the instance of the type of anchor marking relative to the captured image coordinate system of the corresponding captured image.

13. The decoding system of claim 10, wherein, for each captured image of the multiple captured images:

the type of anchor marking comprises one type of anchor marking of multiple types of anchor marking;

the type of target marking comprises one type of target marking of multiple types of target marking; and the processor is further configured to:

analyze the image data to search for instance of each type of anchor marking of the multiple types of anchor marking within the captured image;

for each instance of a type of anchor marking of the multiple types of anchor marking that is identified as present within the image, the processor is further configured to:

identify the location and the orientation of the instance of the type anchor marking within the captured image coordinate system;

correlate the type of anchor marking to a corresponding type of target marking of the multiple types of target marking and a relative location of the corresponding type of target marking to the type of anchor marking within the normalized coordinate system; and employ the location of the instance of the type of anchor marking within the captured image coordinate system, the orientation of the instance of the type of anchor marking relative to the captured image coordinate system, and the relative location of the corresponding type of target marking to the type of anchor marking within the normalized coordinate system to derive a location of a corresponding instance of the corresponding type of target marking within the captured image coordinate system; and for each instance of a type of target marking of the multiple types of target marking that corresponds to an instance of a type of anchor marking of the multiple types of anchor marking that is identified as present within the image, the processor is further configured to:

perform an attempt at interpreting the instance of the type target marketing at the derived location within the captured image coordinate system to decode corresponding data encoded within the instance of the corresponding type of target marking; and in response to a successful decode of the corresponding data, transmit the corresponding data to the server via the network.

14. The decoding system of claim 10, wherein:

the processor comprises at least one of multiple single-instruction-multiple-data (SIMD) components or at least one of multiple graphics processing unit (GPU) components;

the processor comprises at least one core component;

the processor is configured to employ the at least one SIMD component or the at least one GPU component to analyze the multiple captured images at least partially in parallel to identify each instance of the type of anchor marking in each image of the multiple captured images; and the processor is configured to employ the at least one core component to perform the attempts at interpretation.

15. The decoding system of claim 10, further comprising a conveyor system, wherein the multiple cameras are positioned in a manner that surrounds a location along a path of the conveyor belt.

16. A method for decoding data encoded within encoded data markings, the method comprising:

receiving, at a decoding device, image data from a camera of a captured image captured by the camera, wherein the captured image comprises a two-dimensional (2D) array of pixels that define a 2D captured image coordinate system;

analyzing, by a processor of the decoding device, the image data to identify an instance of an anchor marking at a location within the captured image coordinate system, and to derive an orientation of the instance of the type of anchor marking to the captured image coordinate system;

correlating the type of anchor marking to a relative location of a corresponding type of target marking to the type of anchor marking within a 2D normalized coordinate system;

employing, by the processor, the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system;

performing, by the processor, an attempt at interpretation of the instance of the target marking at the derived location within the captured image coordinate system to decode data encoded within the instance of the type of target marking;

in response to a successful decode of the data, transmitting the data to a server via a network;

generating, by the processor, one or more exploratory locations within the captured image coordinate system based on a preselected balance of exploitation and exploration of relative locations of the type of target marking to the type of anchor marking within the normalized coordinate system;

performing, by the processor, an attempt at interpretation of the instance of the type of target marking within the captured image at each exploratory location of the one or more exploratory locations to decode the data encoded within the instance of the type of target marking thereat; and updating, by the processor, the indication within the model of the relative location of the type of target marking to the type of anchor marking based on whether the decode of the data at the derived location and at each exploratory location of the one or more exploratory locations was successful or unsuccessful.

17. The method of claim 16, wherein:
the relative location of the type of target marking to the type of anchor marking within the normalized coordinate system is indicated by a model generated by training the decoding device; and
the method comprises, in response to at least one of the successful decode of the data and an unsuccessful decode of the data, updating, by the processor, the indication within the model of the relative location of the type of target marking to the type of anchor marking within the normalized coordinate system.

18. The method of claim 16, comprising:
receiving, at the decoding device, and with the image data, skew data indicative of a degree of skew of a surface of an object that carries the instance of the type of anchor marking relative to the camera; and
employing, by the processor, the skew data to derive the orientation of the instance of the type of anchor marking relative to the captured image coordinate system.

19. A method: for decoding data encoded within encoded data markings, the method comprising:
receiving, at a decoding device, image data from a camera of a captured image captured by the camera, wherein the captured image comprises a two-dimensional (2D) array of pixels that define a 2D captured image coordinate system;

analyzing, by a processor of the decoding device, the image data to identify an instance of an anchor marking at a location within the captured image coordinate system, and to derive an orientation of the instance of the type of anchor marking to the captured image coordinate system;

correlating the type of anchor marking to a relative location of a corresponding type of target marking to the type of anchor marking within a 2D normalized coordinate system;

employing, by the processor, the location of the instance of the type of anchor marking within the captured image coordinate system, the orientation of the instance of the type of anchor marking relative to the captured image coordinate system, and the relative location of the type of target marking to the type of anchor marking within the normalized coordinate system to derive a location of an instance of the type of target marking within the captured image coordinate system;

performing, by the processor, an attempt at interpretation of the instance of the target marking at the derived location within the captured image coordinate system to decode data encoded within the instance of the type of target marking;

in response to a successful decode of the data, transmitting the data to a server via a network, wherein:
the type of anchor marking comprises one type of anchor marking of multiple types of anchor marking; and
the type of target marking comprises one type of target marking of multiple types of target marking;

analyzing, by the processor, the image data to search for each type of anchor marking of the multiple types of anchor marking within the captured image;

for each instance of a type of anchor marking of the multiple types of anchor marking that is identified as present within the image, performing operations comprising:
identifying, by the processor, the location and the orientation of the instance of the type of anchor marking within the captured image coordinate system;
correlating the type of anchor marking to a corresponding type of target marking of the multiple types of target marking and a relative location of the corresponding type of target marking to the type of anchor marking within the normalized coordinate system; and
employing, by the processor, the location of the instance of the type of anchor marking within the captured image coordinate system, the orientation of the instance of the type of anchor marking relative to the captured image coordinate system, and the relative location of the corresponding type of target indicia to the type of anchor marking within the normalized coordinate system to derive a location of a corresponding instance of the corresponding type of target marking within the captured image coordinate system; and for each instance of a type of target marking of the multiple types of target marking that corresponds to an instance of the type of anchor marking of the multiple type of anchor marking that is identified as present within the image, performing operations comprising:

performing, by the processor, an attempt at interpreting the instance of the type of target marking at the derived location within the captured image coordinate system to decode corresponding data encoded within the instance of the corresponding type of target marking; and in response to a successful decode of the corresponding data, transmitting the corresponding data to the server via the network.

20. The method of claim 19, comprising analyzing, by the processor, the image data to search for the multiple types of anchor marking within the captured image at least partially in parallel.

* * * * *